United States Patent
Wang et al.

(10) Patent No.: US 9,952,034 B2
(45) Date of Patent: Apr. 24, 2018

(54) OPTICAL INTERFEROMETRIC SYSTEM FOR MEASUREMENT OF A FULL-FIELD THICKNESS OF A PLATE-LIKE OBJECT IN REAL TIME

(71) Applicant: National Tsing Hua University, Hsinchu (TW)

(72) Inventors: Wei-Chung Wang, Hsinchi (TW); Po-Chi Sung, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 15/609,862

(22) Filed: May 31, 2017

(65) Prior Publication Data
US 2017/0370703 A1    Dec. 28, 2017

(30) Foreign Application Priority Data
Jun. 28, 2016    (TW) .............................. 105120262 A

(51) Int. Cl.
G01B 11/06   (2006.01)
G01B 9/02    (2006.01)
G01J 9/04    (2006.01)

(52) U.S. Cl.
CPC .......... *G01B 11/06* (2013.01); *G01B 9/02019* (2013.01); *G01J 9/04* (2013.01); *G01B 2290/45* (2013.01)

(58) Field of Classification Search
CPC .......................... G01B 11/06; G01B 11/0675; G01B 9/02019; G01B 9/02027; G01B 9/02038; G01J 9/02
See application file for complete search history.

(56) References Cited

U.S. PATENT DOCUMENTS

| 4,815,856 A * | 3/1989 | Bruce ................ G01B 11/0675 356/504 |
| 2004/0027579 A1 | 2/2004 | Lee et al. |
| 2009/0187383 A1* | 7/2009 | Li .......................... G01B 11/06 702/191 |
| 2015/0226538 A1* | 8/2015 | Otao ................... G01B 9/02022 356/511 |

FOREIGN PATENT DOCUMENTS

TW    M453837 U1    5/2013

* cited by examiner

*Primary Examiner* — Jonathan Hansen
(74) *Attorney, Agent, or Firm* — Birch, Stewart, Kolasch & Birch, LLP

(57) ABSTRACT

An optical interferometric system for measurement of a full-field thickness of a plate-like object in real time includes two light sources, two screens, two image capturing devices, and an image processing module. The light sources radiate incident lights toward a reference point on the plate-like object in respective directions to produce respective interference fringe patterns (IFPs). The image capturing devices capture light intensity distribution images respectively of the IFPS imaged respectively on the screens. The image processing module calculates a fringe order at the reference point according to the light intensity distribution images, and obtains a full-field thickness distribution of the plate-like object according to the fringe order.

12 Claims, 27 Drawing Sheets
(9 of 27 Drawing Sheet(s) Filed in Color)

OPTICAL INTERFEROMETRIC SYSTEM FOR MEASUREMENT OF A FULL-FIELD THICKNESS OF A PLATE-LIKE OBJECT IN REAL TIME

CROSS-REFERENCE TO RELATED APPLICATION

This application claims priority of Taiwanese Patent Application No. 105120262, filed on Jun. 28, 2016.

FIELD

The disclosure relates to an optical interferometric system, and more particularly to an optical interferometric system for measurement of a full-field thickness of a plate-like object in real time.

BACKGROUND

Taiwanese Patent No. I486550 provides a conventional optical interferometric apparatus for real-time full-field thickness inspection using angular incidence interferometry. The conventional optical interferometric apparatus includes a light source, a screen, an image acquisition unit and an image processing module. The light source radiates a spherical-wave front light beam on an object to be measured at an oblique angle, an interference fringe pattern (IFP) is imaged on the screen, the image acquisition unit captures the IFP on the screen and converts the image into a digital image, and the image processing module analyzes the digital image of the IFP to obtain a full-field thickness distribution of the object. However, the conventional optical interferometric apparatus cannot directly obtain the full-field thickness distribution of the object, and needs additional input of an average thickness of the object or an absolute thickness at one point of the object for calculating the full-field thickness distribution. Namely, additional time and measuring instruments (e.g., an instrument for measuring the absolute thickness) are required on the calculation of the full-field thickness distribution of the object.

SUMMARY

Therefore, an object of the disclosure is to provide an optical interferometric system for measurement of a full-field thickness of a plate-like object in real time that can alleviate at least one of the drawbacks of the prior art.

According to the disclosure, the optical interferometric system for measurement of a full-field thickness of a plate-like object in real time includes a first light source, a second light source, a first screen, a second screen, a first image capturing device, a second image capturing device and an image processing module.

The first light source is for radiating a first incident light in a first direction toward a reference point located on a surface of the plate-like object to produce a first interference fringe pattern (IFP). The second light source is for radiating a second incident light in a second direction different from the first direction toward the reference point to produce a second IFP. The first incident light and the second incident light are coherent, have spherical wavefronts, and radiate the plate-like object with the spherical wave fronts. The first screen and the second screen allow the first and second IFPs to be imaged thereon, respectively.

The first image capturing device and the second image capturing device are disposed to face the first screen and the second screen, respectively, and are configured to respectively capture first and second light intensity distribution images respectively of the first and second IFPs imaged respectively on the first and second screens. The image processing module is electrically connected to the first image capturing device and the second image capturing device, and is configured to convert the first and second light intensity distribution images into digital data, to calculate a fringe order at the reference point according to digital data, and to obtain a full-field thickness distribution of the plate-like object according to the fringe order.

BRIEF DESCRIPTION OF THE DRAWINGS

The patent or application file contains at least one color drawing. Copies of this patent or patent application publication with color drawing will be provided by the USPTO upon request and payment of the necessary fee.

Other features and advantages of the disclosure will become apparent in the following detailed description drawings, of which.

DETAILED DESCRIPTION

Figure 1:
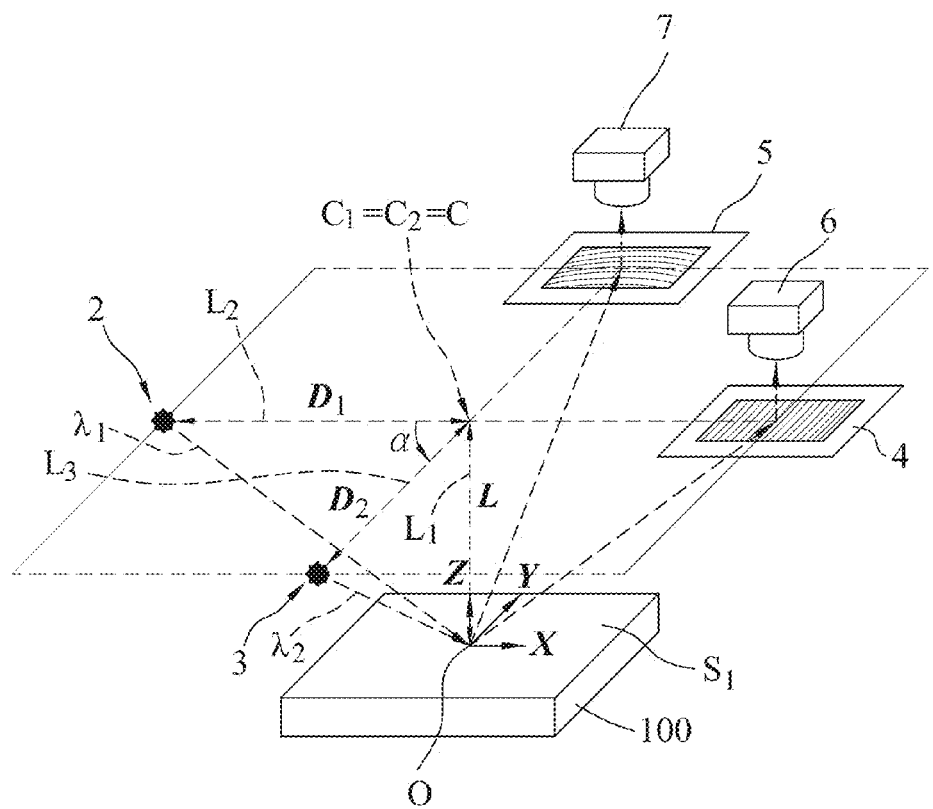
FIG. 1 is a schematic perspective view of a first embodiment of the optical interferometric system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 4, the first embodiment of the optical interferometric system for measurement of a full-field thickness of a plate-like object 100 in real time according to the disclosure includes a first light source 2, a second light source 3, a first screen 4, a second screen 5, a first image capturing device 6, a second image capturing device 7, and an image processing module 8.

Figure 2:
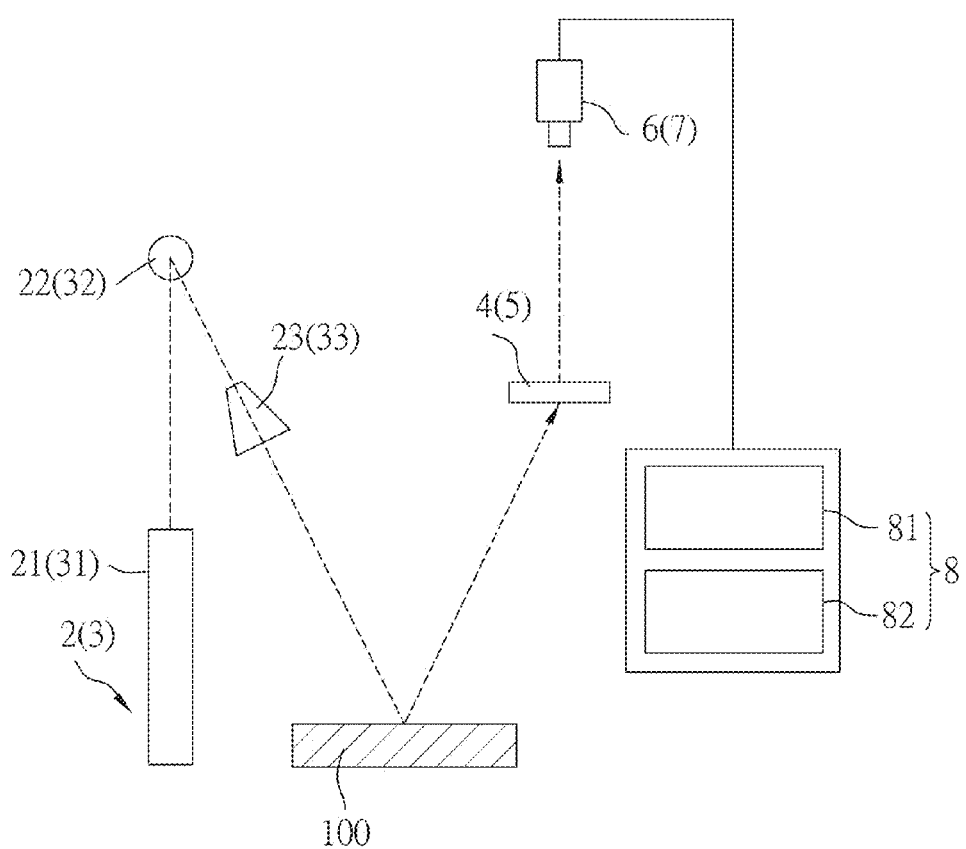
FIG. 2 is a schematic side view of the first embodiment.

The first light source 2 is for radiating a first incident light ($\lambda_1$) in a first direction toward a reference point (O) located on a first surface ($S_1$) of the plate-like object 100 to produce a first interference fringe pattern (IFP). More specifically, as shown in FIG. 2, the first light source 2 includes a laser source 21, a beam steering element 22 and a spatial-filter point-expanding device 23. The laser source 21 is for outputting a laser beam, and the beam steering element is for guiding the laser beam toward the spatial-filter point-expanding device 23. The spatial-filter point-expanding device 23 is configured to filter and expand the laser beam from the beam steering element 22 so as to output the first incident light ($\lambda_1$) (see FIG. 1). The first incident light ($\lambda_1$) is coherent, has spherical wavefronts, and radiates the plate-like object 100 with the spherical wavefronts.

The second light source 3 is for radiating a second incident light ($\lambda_2$) in a second direction different from the first direction toward the reference point (O) to produce a second IFP. The second light source 3 includes a laser source 31, a beam steering element 32 and a spatial-filter point-expanding device 33. The laser source 31 is for outputting a laser beam, and the beam steering element 32 is for guiding the laser beam toward the spatial-filter point-expanding device 33. The spatial-filter point-expanding device 33 is configured to filter and expand the laser beam from the beam steering element 32 so as to output the second incident light ($\lambda_2$) (see FIG. 1). The second incident light ($\lambda_2$) is coherent, has spherical wavefronts, and radiates the plate-like object 100 with the spherical wavefronts. It should be noted that bold dashed lines in FIG. 1 and dashed lines in FIG. 2 each illustrate an optical path of a central point of the spherical wavefronts of the first/second incident light ($\lambda_1$, $\lambda_2$).

It should be noted that the plate-like object 100 must be penetrable by the first and second incident lights ($\lambda_1$, $\lambda_2$). In other words, the first and second incident lights ($\lambda_1$, $\lambda_2$) must be able to penetrate and pass through the plate-like object 100. For example, in a case that the plate-like object 100 is made of a transparent material, such as glass, polyethylene terephthalate (PET), polyethylene naphthalate (PEN) or polycarbonate (PC), the first laser source 21 and the second laser source 31 are each configured to output a helium-neon (He—Ne) laser beam. In other cases that the plate-like object 100 is made of a non-transparent material, such as silicon wafer or metallic film, the first laser source 21 and the second laser source 31 are each configured to output an infrared laser beam.

In order to more clearly describe positions of the components of the optical interferometric system, the following description about the positions of the components are described with respect to a Cartesian coordinate system with the reference point (O) serving as the origin (0,0). Some properties related to the position may also be expressed by a function of position. For example, a thickness of the plate-like object 100 at a point (P) located at coordinates (x,y) may be expressed by t(x,y).

In the first embodiment, the first light source 2 and the second light source 3 are disposed at the same side of the plate-like object 100, are spaced apart from each other, and are arranged in a manner that a first distance ($D_1$), which is a shortest distance between the first light source 2 and a normal ($L_1$) to the first surface ($S_1$) of the plate-like object 100 at the reference point (O), is equal to a second distance ($D_2$), which is a shortest distance between the second light source 3 and the normal ($L_1$); the first distance ($D_1$) and the second distance ($D_2$) are both equal to the value of D, i.e., $D_1=D_2=D$. Further, a first imaginary extension line ($L_2$) extending from the first light source 2 toward the normal ($L_1$) and perpendicular to the normal ($L_1$) intersects the normal ($L_1$) at a first intersection point ($C_1$), a second imaginary extension line ($L_3$) extending from the second light source 3 toward the normal ($L_1$) and perpendicular to the normal ($L_1$) intersects the normal ($L_1$) at a second intersection point ($C_2$), and a third distance between the first intersection point ($C_1$) and the reference point (O) is equal to a fourth distance between the second intersection point ($C_2$) and the reference point (O). In this embodiment as shown in FIG. 1, the normal ($L_1$) and the first and second imaginary extension lines ($L_2$, $L_3$) intersect each other at a common point (C), i.e., $C_1=C_2=C$, and a distance between the common point (C) and the reference point (O) (i.e., the third and fourth distances) is L. Besides, an included angle a between the first imaginary extension line ($L_2$) and the second imaginary extension line ($L_3$) is a right angle, i.e., $\alpha=90°$.

It should be noted that the included angle a is not limited to a right angle, and may be any angle except zero degrees (i.e., $\alpha \neq 0°$). The first distance ($D_1$), the second distance ($D_2$) and the distance (L) are not limited to any specific values as long as the first light source 2 and the second light source 3 can clearly illuminate the plate-like object 100 to produce the first and second IFPs on the first screen 4 and the second screen 5, respectively. Since the first distance ($D_1$) is equal to the second distance ($D_2$) ($D_1=D_2=D$) and the third distance is equal to the fourth distance, a first angle of incidence of the first incident light ($\lambda_1$) and a second angle of incidence of the second incident light ($\lambda_2$) at the reference point (O) are identical.

Figure 3:
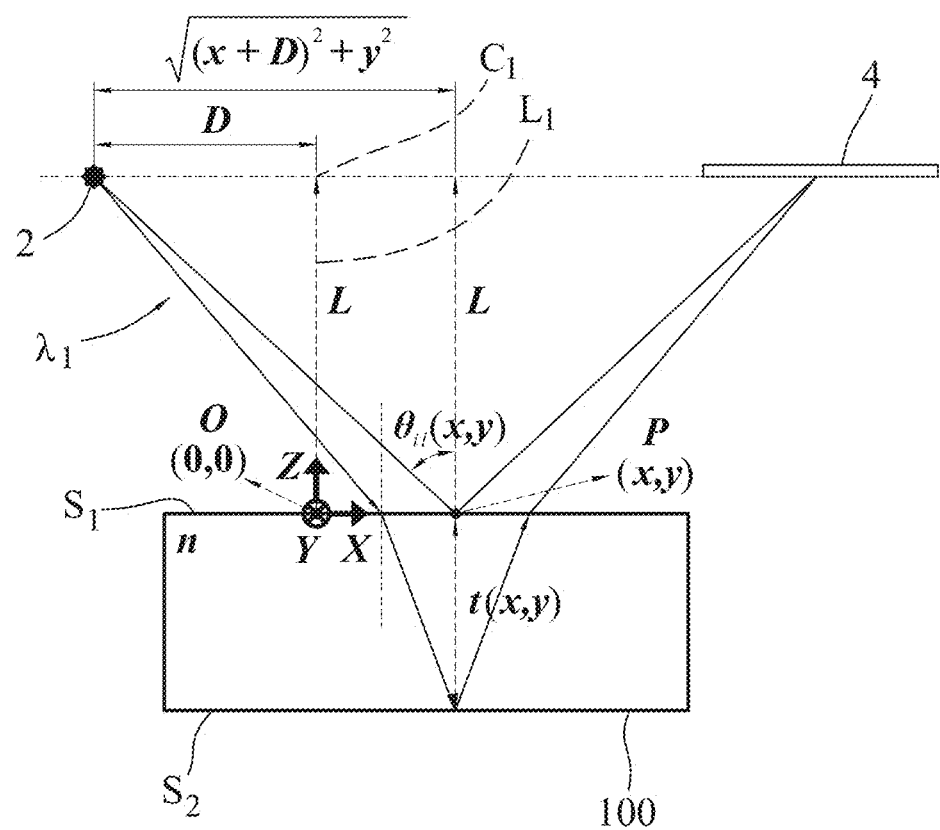
FIG. 3 is a schematic side view illustrating an optical path of a first incident light radiated by a first light source of the first embodiment.
Figure 4:
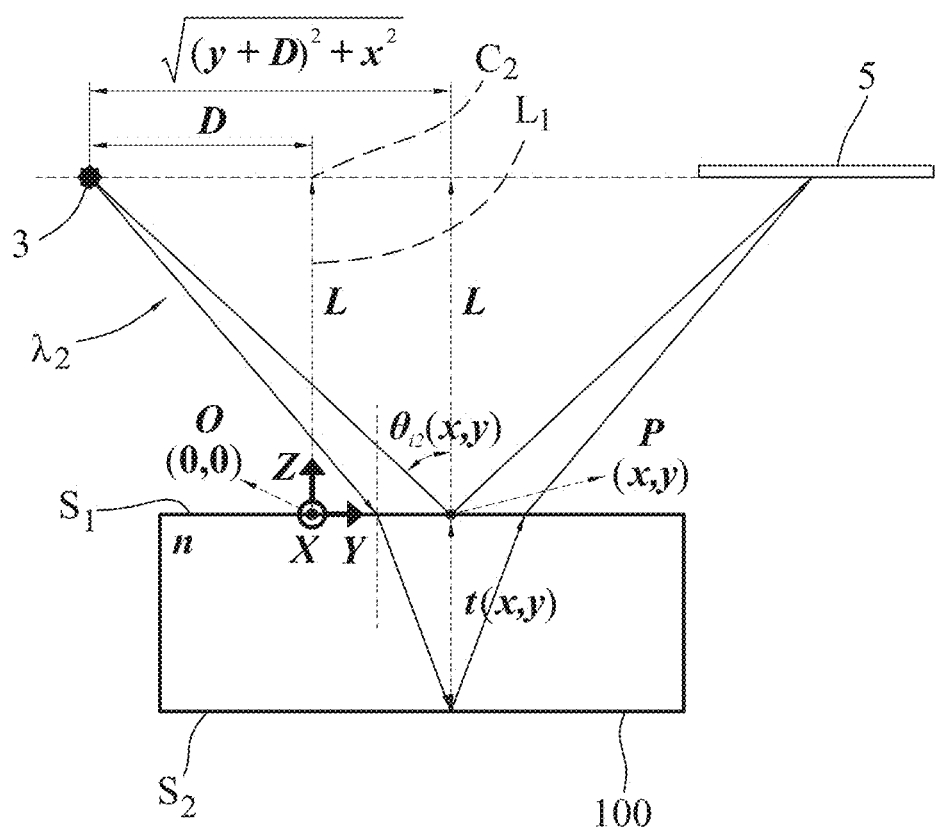
FIG. 4 is a schematic side view illustrating an optical path of a second incident light radiated by a second light source of the first embodiment.

When the first incident light ($\lambda_1$) and the second incident light ($\lambda_2$) respectively radiate toward the plate-like object 100, the first incident light ($\lambda_1$) and the second incident light ($\lambda_2$) are reflected and propagate to the first screen 4 and the second screen 5, respectively, such that the first and second IFPs are imaged on the first screen 4 and the second screen 5, respectively. More Specifically, as shown in FIG. 3, since the first incident light ($\lambda_1$) has spherical wavefronts, a part of the first incident light ($\lambda_1$) directly reflects at an arbitrary point (P) at coordinates (x,y) on the first surface ($S_1$) and propagates to the first screen 4 and another part of the first incident light ($\lambda_1$) penetrates the first surface ($S_1$) of the plate-like object 100 when the first incident light ($\lambda_1$) propagates to the arbitrary point (P) at the first angle of incidence $\theta_{i1}(x,y)$. According to Snell's Law, the another part of the first incident light ($\lambda_1$) is refracted at the interface between air and the plate-like object 100 (i.e. the first surface ($S_1$)), propagates through the plate-like object 100, is reflected by a second surface ($S_2$) of the plate-like object 100 that is opposite to the first surface ($S_1$), and is refracted again when penetrating the first surface ($S_1$) into the air, followed by propagating to the first screen 4. The two parts of the first incident light ($\lambda_1$) propagate to the screen 4 at the same point, and interfere with each other due to the difference between path lengths respectively of the two parts of the first incident light ($\lambda_1$). As a result, the first IFP is imaged on the first screen 4. Similarly, the second IFP is imaged on the second screen 5 as shown in FIG. 4.

Referring to FIG. 2, the first image capturing device 6 and the second image capturing device 7 are disposed to face the first screen 4 and the second screen 5, respectively. The first and second image capturing devices 6, 7 are configured to respectively capture first and second light intensity distribution images respectively of the first and second IFPs imaged respectively on the first screen 4 and the second screen 5. In the first embodiment, each of the first image capturing device 6 and the second image capturing device 7 is a camera implemented using charge-coupled devices.

The image processing module 8 is electrically connected to the first image capturing device 6 and the second image capturing device 7, and includes a processing unit 81 and a display device 82. The processing unit 81 is configured to convert the first and second light intensity distribution images into digital data, to calculate a fringe order at the reference point (O) according to the digital data, and to obtain a full-field distribution of the thickness t(x,y) of the plate-like object 100 according to the fringe order. The display device 82 is configured to display an image of the full-field distribution of the thickness t(x,y). In the first embodiment, for example, the image processing module 8 may be a computer assembly, the processing unit 81 may be a computer having a numerical analysis software installed therein, and the display device 82 may be a computer monitor or a computer display that is connected to the computer which serves as the processing unit 81. It should be noted that the image processing module 8 and the display device 82 are not limited to the examples described above.

More Specifically, the image processing module 8 is configured to obtain the full-field distribution of the thickness t(x,y) of the plate-like object 100 by the following algorithm. Referring to FIGS. 3 and 4, the first angle of incidence $\theta_{i1}(0,0)$ of the first incident light ($\lambda_1$) at the reference point (O) with coordinates (0,0) and the second angle of incidence $\theta_{i2}(0,0)$ of the second incident light ($\lambda_2$) at the reference point (O) with coordinates (0,0) are expressed by Equation (1) below.

$$\theta_{i1}(0,0) = \theta_{i2}(0,0) = \tan^{-1}\frac{D}{L} \tag{1}$$

In the first embodiment, since the first imaginary extension line ($L_2$) is perpendicular to the second imaginary extension line ($L_3$), i.e., $\alpha=90°$, the first angle of incidence $\theta_{i1}(x,y)$ and the second angle of incidence $\theta_{i2}(x,y)$ at the arbitrary point (P) with coordinates (x,y) on the plate-like object 100 can be expressed by Equations (2) and (3) below.

$$\theta_{i1}(x,y) = \tan^{-1}\frac{\sqrt{(x+D)^2+y^2}}{L} \tag{2}$$

$$\theta_{i2}(x,y) = \tan^{-1}\frac{\sqrt{x^2+(y+D)^2}}{L} \tag{3}$$

Then, the thickness t(x,y) at the arbitrary point (P) with coordinates (x,y) on the plate-like object 100 can be derived as the following Equations (4) and (5) according to the geometric relationships expressed by Equations (2) and (3) with reference to FIGS. 3 and 4.

$$t(x,y) = \frac{1}{2n\cos\left[\sin^{-1}\left(\frac{1}{n}\sin\theta_{i1}(x,y)\right)\right]}\frac{\lambda}{2\pi}\varphi_1(x,y) \tag{4}$$

$$t(x,y) = \frac{1}{2n\cos\left[\sin^{-1}\left(\frac{1}{n}\sin\theta_{i2}(x,y)\right)\right]}\frac{\lambda}{2\pi}\varphi_2(x,y) \tag{5}$$

In Equations (4) and (5), n denotes an index of refraction of the plate-like object 100, $\lambda$ denotes a wavelength of the first and second incident lights ($\lambda_1$, $\lambda_2$), $\varphi_1$(x,y) denotes a first absolute phase of the first IFP attributed to the first incident light ($\lambda_1$) striking on the arbitrary point (P) with coordinates (x,y), and $\varphi_2$(x,y) denotes a second absolute phase of the second IFP attributed to the second incident light ($\lambda_2$) striking on the arbitrary point (P) with coordinates (x,y). Further, Equations (4) and (5) of the thickness t(x,y) of the arbitrary point (P) with coordinates (x,y) can be rewritten as the following Equation (6) by substituting the term $$\frac{\lambda}{4\pi n\cos\left[\sin^{-1}\left(\frac{1}{n}\sin\theta_{i1}(x,y)\right)\right]}$$

in Equation (4) by $A_1$(x,y) and substituting the term $$\frac{\lambda}{4\pi n\cos\left[\sin^{-1}\left(\frac{1}{n}\sin\theta_{i2}(x,y)\right)\right]}$$

in Equation (5) by $A_2$(x,y).

$$t(x,y) = A_1(x,y)\varphi_1(x,y) = A_2(x,y)\varphi_2(x,y) \tag{6}$$

The values of $A_1(x,y)$ and $A_2(x,y)$ are known since the first angle of incidence $\theta_{i1}(x,y)$ and the second angle of incidence $\theta_{i2}(x,y)$ can be obtained according to Equations (2) and (3).

It should be noted that the reference point (O) may not be the origin (0,0) of the Cartesian coordinate system in some embodiments. Therefore, the coordinates of the reference point (O) is expressed by $(x_0,y_0)$ for deriving a general expression of the full-field distribution of the thickness $t(x,y)$ of the plate-like object 100. Accordingly, the first angle of incidence $\theta_{i1}(x,y)$ and the second angle of incidence $\theta_{i2}(x,y)$ at the arbitrary point (P) with coordinates (x,y) on the plate-like object 100 can be rewritten from Equations (2) and (3) as follows.

$$\theta_{i1}(x, y) = \tan^{-1} \frac{\sqrt{(x - x_0 + D)^2 + (y - y_0)^2}}{L} \quad (7)$$

$$\theta_{i2}(x, y) = \tan^{-1} \frac{\sqrt{(x - x_0)^2 + (y - y_0 + D)^2}}{L} \quad (8)$$

According to Equation (6), the thickness $t(x_0,y_0)$ at the reference point (O) with coordinates $(x_0,y_0)$ can be expressed by $$t(x_0, y_0) = A_1(x_0, y_0)\varphi_1(x_0, y_0) = A_2(x_0, y_0)\varphi_2(x_0, y_0).$$

Since the first and second incident lights $(\lambda_1, \lambda_2)$ both strike on the reference point (O) with coordinates $(x_0,y_0)$ and the first angle of incidence is identical to the second angle of incidence $$\left(\theta_{i1}(x_0, y_0) = \theta_{i2}(x_0, y_0) = \tan^{-1}\frac{D}{L}\right),$$

the term $A_1(x_0,y_0)$ is identical to the term $A_2(x_0,y_0)$ (i.e., $A_1(x_0,y_0)=A_2(x_0,y_0)$), and the first absolute phase $\varphi_1(x_0,y_0)$ is identical to the second absolute phase $\varphi_2(x_0,y_0)$ (i.e., $\varphi_1(x_0,y_0)=\varphi_2(x_0,y_0)$) at the reference point (O) with coordinates $(x_0,y_0)$. Further, the first and second absolute phases $\varphi_1(x,y)$, $\varphi_2(x,y)$ at the arbitrary point (P) with coordinates (x,y) can also be expressed by the following Equations (9) and (10).

$$\varphi_1(x,y) = 2\pi N_1(x_0, y_0) + \varphi_{rel\_1}(x,y) \quad (9)$$

$$\varphi_2(x,y) = 2\pi N_2(x_0, y_0) + \varphi_{rel\_2}(x,y) \quad (10)$$

In Equations (9) and (10), $N_1(x_0,y_0)$ denotes a fringe order of the first IFP at the reference point (O) with coordinates $(x_0,y_0)$, $N_2(x_0,y_0)$ denotes a fringe order of the second IFP at the reference point (O) with coordinates $(x_0,y_0)$ $\varphi_{rel\_1}(x,y)$ denotes a first relative phase of the first IFP at the arbitrary point (P) with coordinates (x,y), and $\varphi_{rel\_1}(x,y)$ denotes a second relative phase of the second IFP at the arbitrary point (P) with coordinates (x,y). In particular, the relative phase (e.g., $\varphi_{rel\_1}(x,y)$ or $\varphi_{rel\_2}(x,y)$) is a difference between the absolute phase (e.g., $\varphi_1(x,y)$ or $\varphi_2(x,y)$) at the arbitrary point (P) with coordinates (x,y) and a portion of the absolute phase at the reference point (O) with coordinates $(x_0,y_0)$ (e.g., $2\pi N_1(x_0,y_0)$ or $2\pi N_2(x_0, y_0)$) that is an integer multiple of $2\pi$. By using the prior art, the values of $\varphi_{rel\_1}(x,y)$ and $\varphi_{rel\_2}(x,y)$ can be directly obtained from the first IFP and the second IFP, respectively.

Since the first absolute phase $\varphi_1(x_0,y_0)$ is identical to the second absolute phase $\varphi_2(x_0,y_0)$ at the reference point (O) with coordinates $(x_0,y_0)$ (i.e., $\varphi_1(x_0,y_0)=\varphi_2(x_0,y_0)$), the fringe orders at the reference point (O) with coordinates $(x_0,y_0)$ should be the same (i.e., $N_1(x_0,y_0)=N_2(x_0,y_0)$). Accordingly, Equation (6) can be rewritten as the following Equations (11) and (12) with reference to Equations (9) and (10).

$$t(x, y) = A_1(x, y)[2\lambda N_1(x_0, y_0) + \varphi_{rel\_1}(x, y)] \quad (11)$$

$$t(x, y) = A_2(x, y)[2\lambda N_1(x_0, y_0) + \varphi_{rel\_2}(x, y)] \quad (12)$$

According to Equations (11) and (12), the fringe order $N_1(x_0,y_0)$ at the reference point (O) with coordinates $(x_0,y_0)$ can be obtained by the following Equation (13).

$$N_1(x_0, y_0) = \text{round}\left\{\frac{A_2(x, y)\varphi_{rel\_2}(x, y) - A_1(x, y)\varphi_{rel\_1}(x, y)}{2\pi[A_1(x, y) - A_2(x, y)]}\right\} \quad (13)$$

According to Equation (13), the fringe order $N_1(x_0,y_0)$ can be obtained from analyzing the digital data at the arbitrary point (P) (i.e., any point) with coordinates (x,y) on the first surface $(S_1)$ of the plate-like object 100. In particular, the image processing module 8 is configured to obtain the fringe order $N_1(x_0,y_0)$ by obtaining the first and second relative phases at the arbitrary point (P) with coordinates (x,y) according to the digital data, and calculating the fringe order based on the first and second relative phases $\varphi_{rel\_1}(x,y)$, $\varphi_{rel\_2}(x,y)$ and $A_1(x,y)$ and $A_2(x,y)$. In other embodiments, the image processing module 8 may be configured to analyze the digital data at several points on the first surface $(S_1)$ of the plate-like object 100 to calculate various values of the fringe order $N_1(x_0,y_0)$, and to obtain an optimal value of the fringe order $N_1(x_0,y_0)$ by statistics. Then, the fringe order $N_1(x_0,y_0)$ is substituted into Equations (11) and (12) to obtain the thickness $t(x,y)$ of the plate-like object 100 at any point (i.e., the distribution of the thickness).

Figure 5:
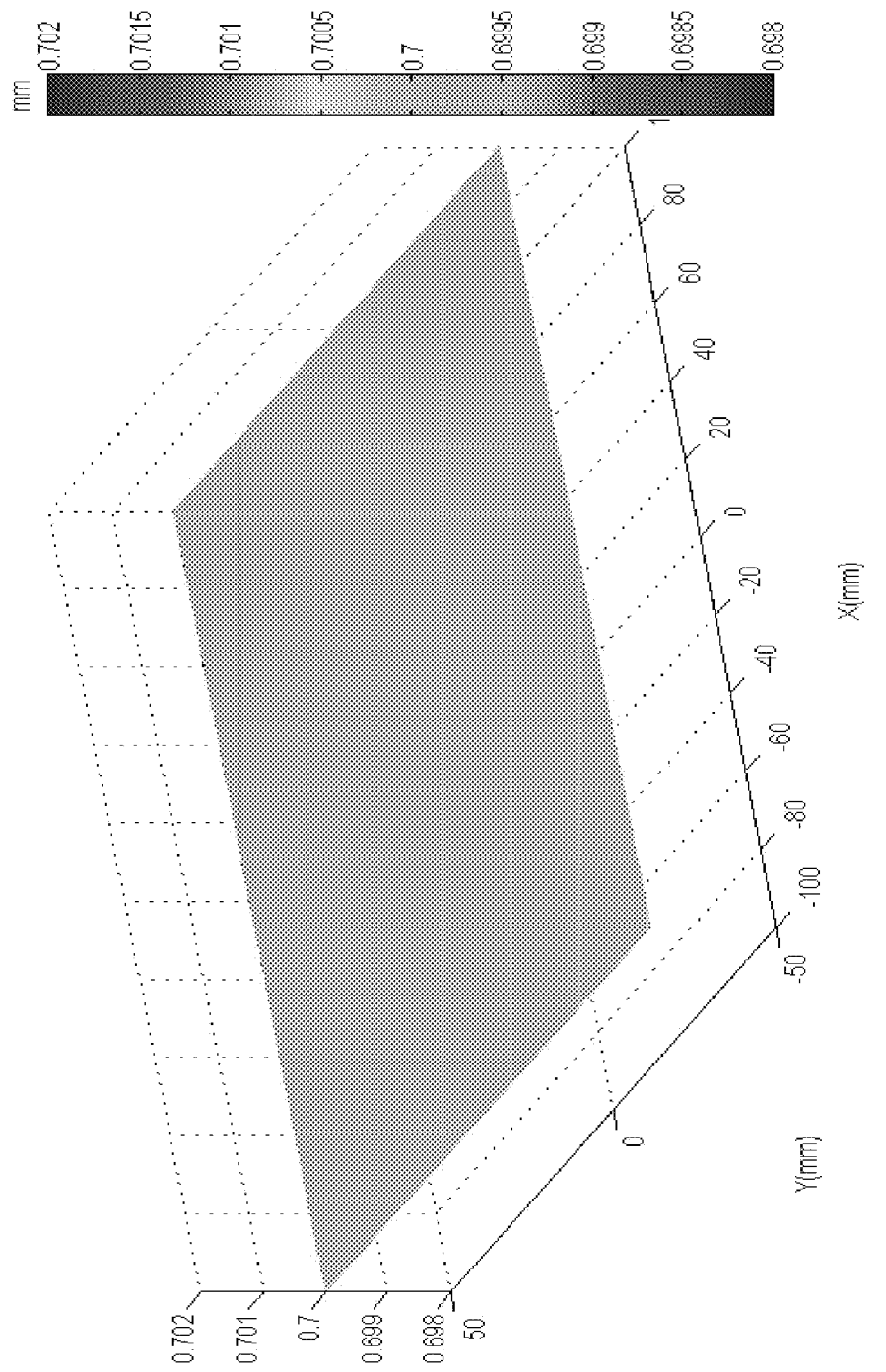
FIG. 5 shows a simulated plate-like object.

For the ease of understanding, a simulation example of measuring the plate-like object 100 according to the disclosure is described below. In this example, a simulation of the plate-like object 100 has a simulated thickness of 0.7 mm, a simulated width of 200 mm, and a simulated length of 100 mm, as shown in FIG. 5.

Figure 6:
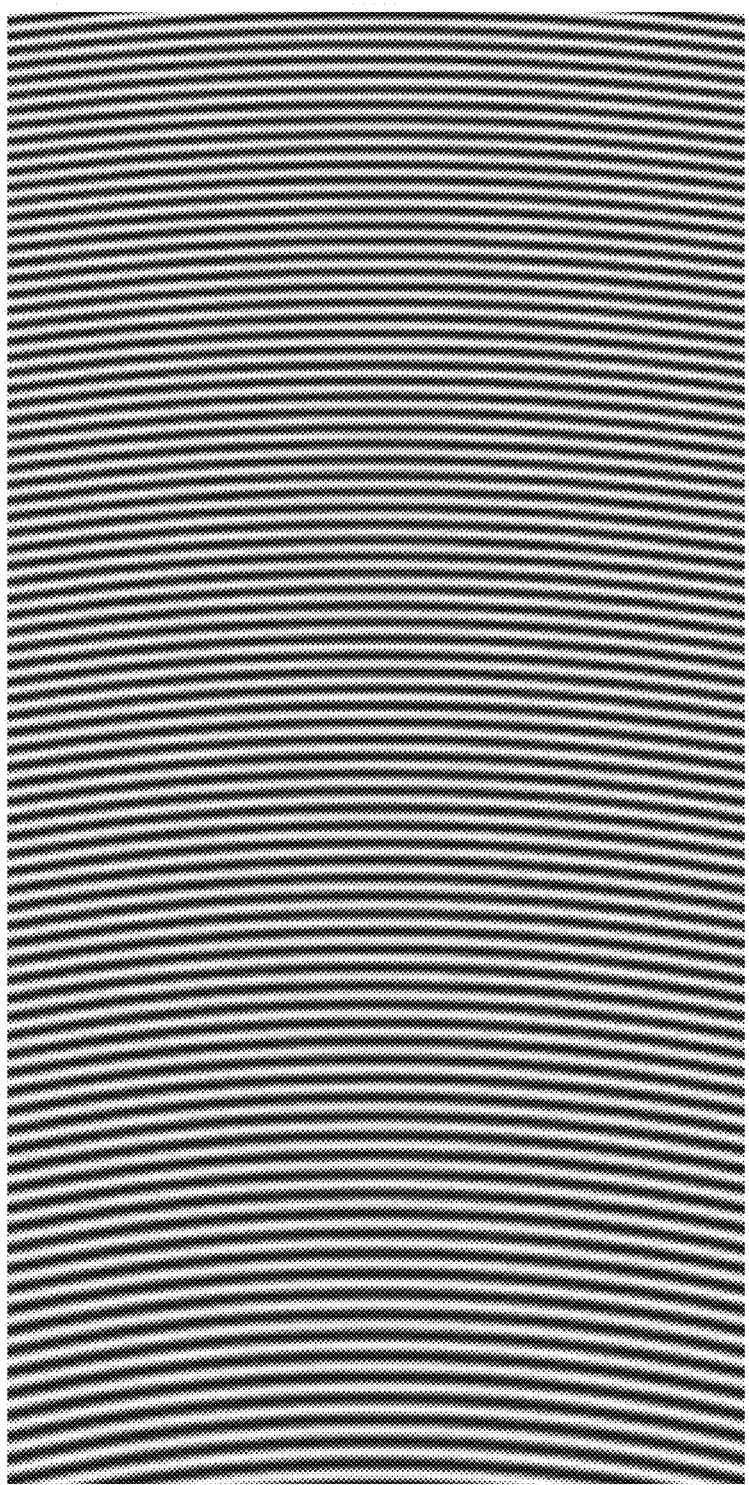
FIG. 6 shows a first interference fringe pattern (IFP) that results from simulation of the first incident light radiated on the simulated plate-like object.
Figure 7:
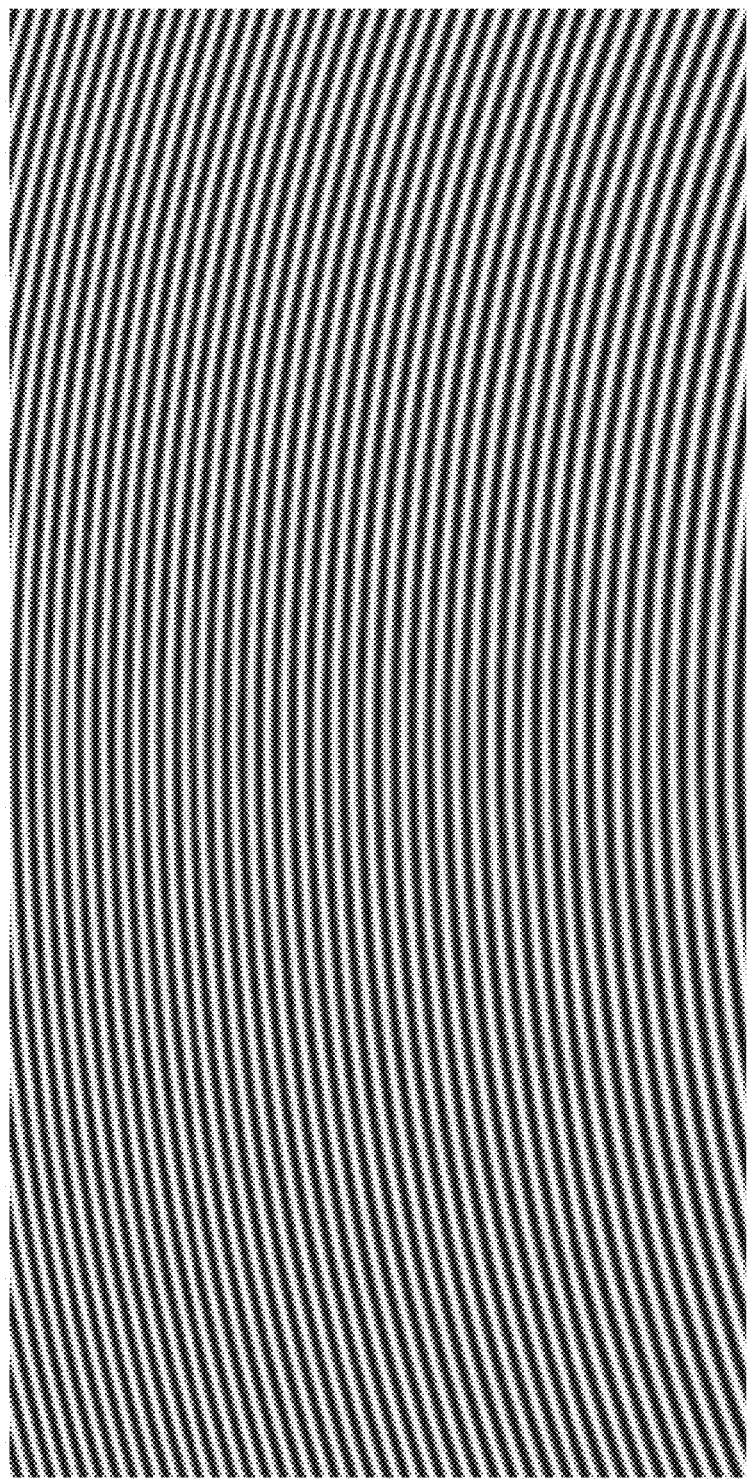
FIG. 7 shows a second IFP that results from simulation of the second incident light radiated on the simulated plate-like object.
Figure 8:
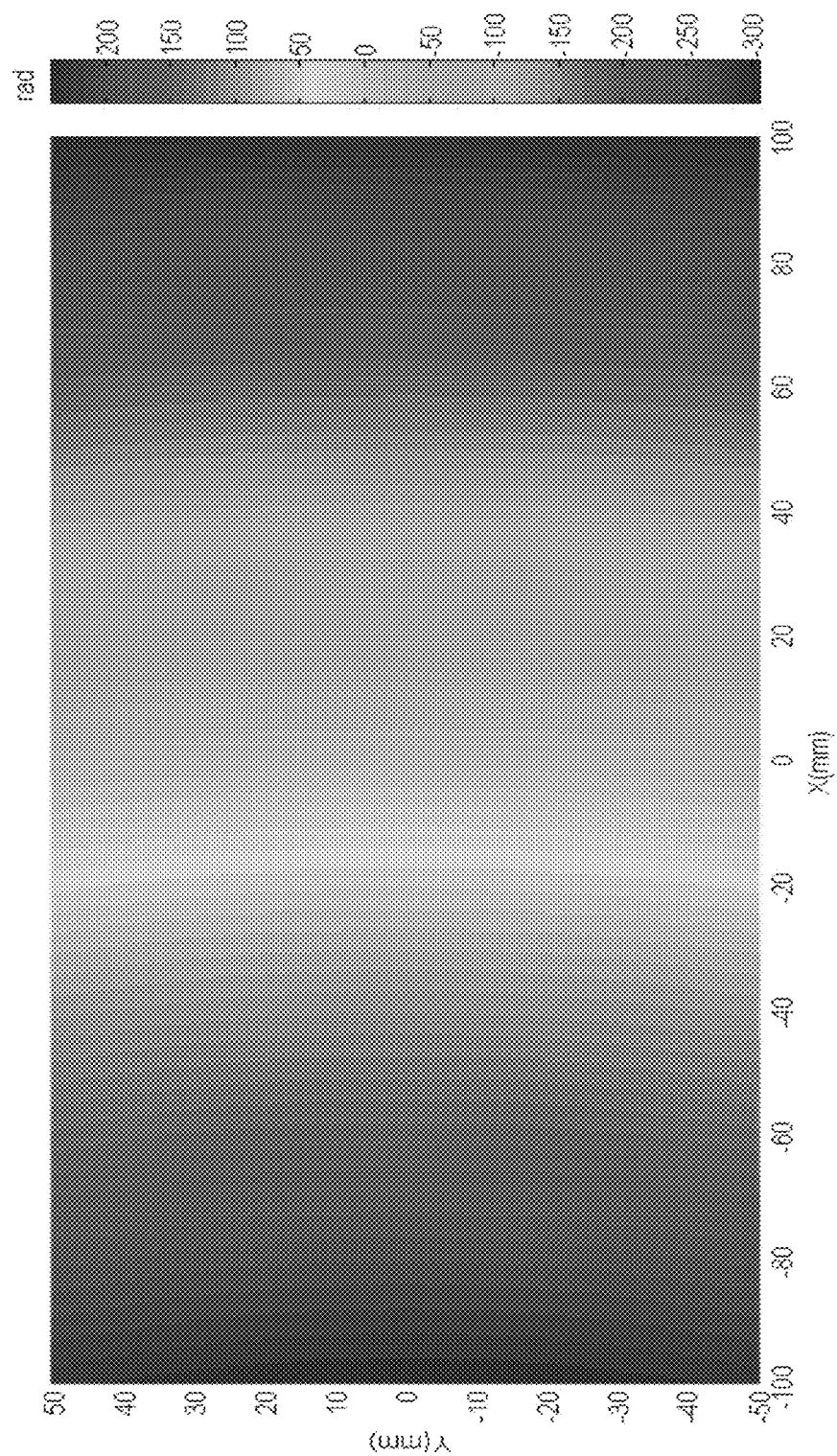
FIG. 8 shows a first relative phase that corresponds to the first IFP of FIG. 6.
Figure 9:
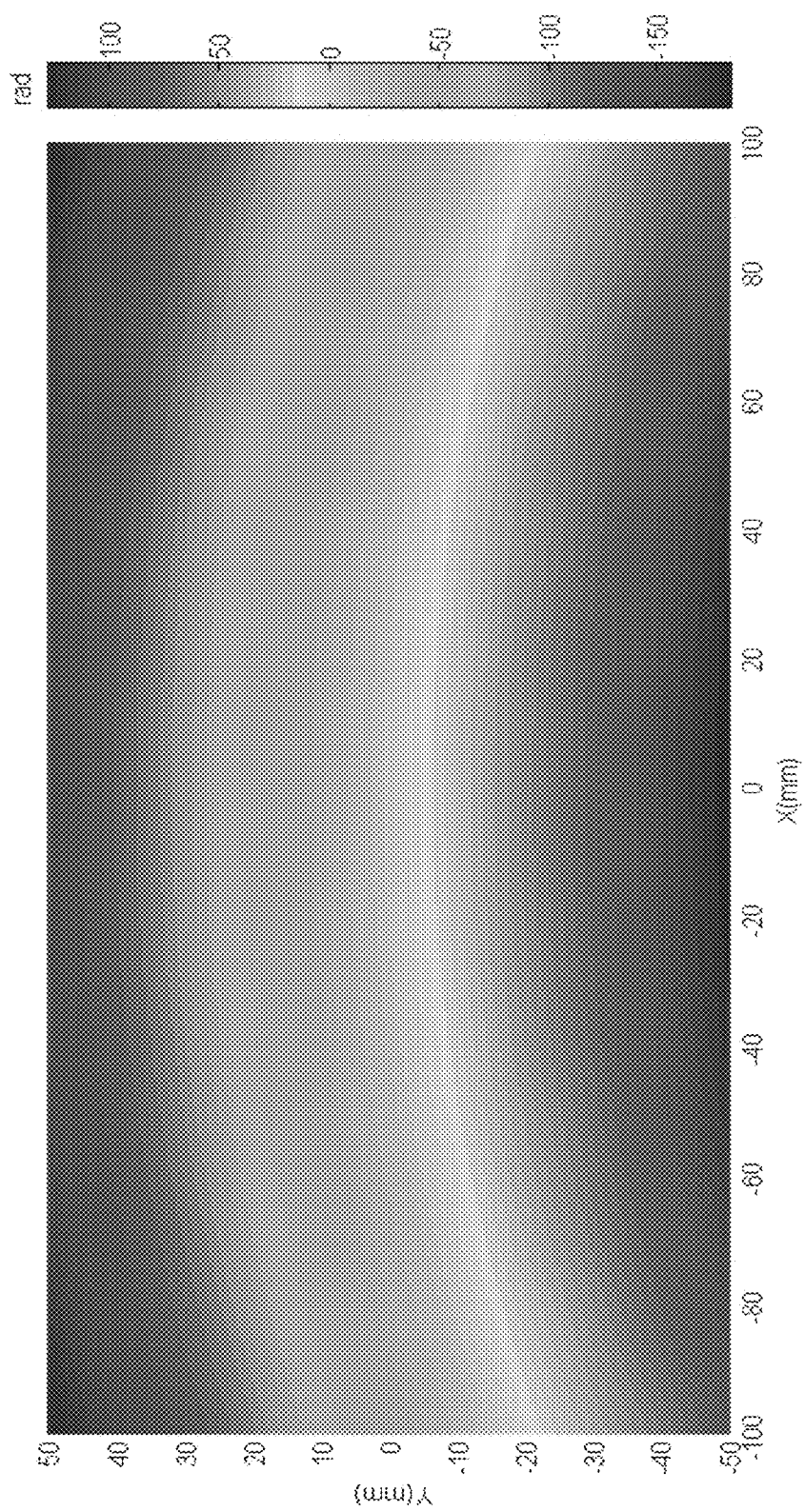
FIG. 9 shows a second relative phase that corresponds to the second IFP of FIG. 7.
Figure 10:
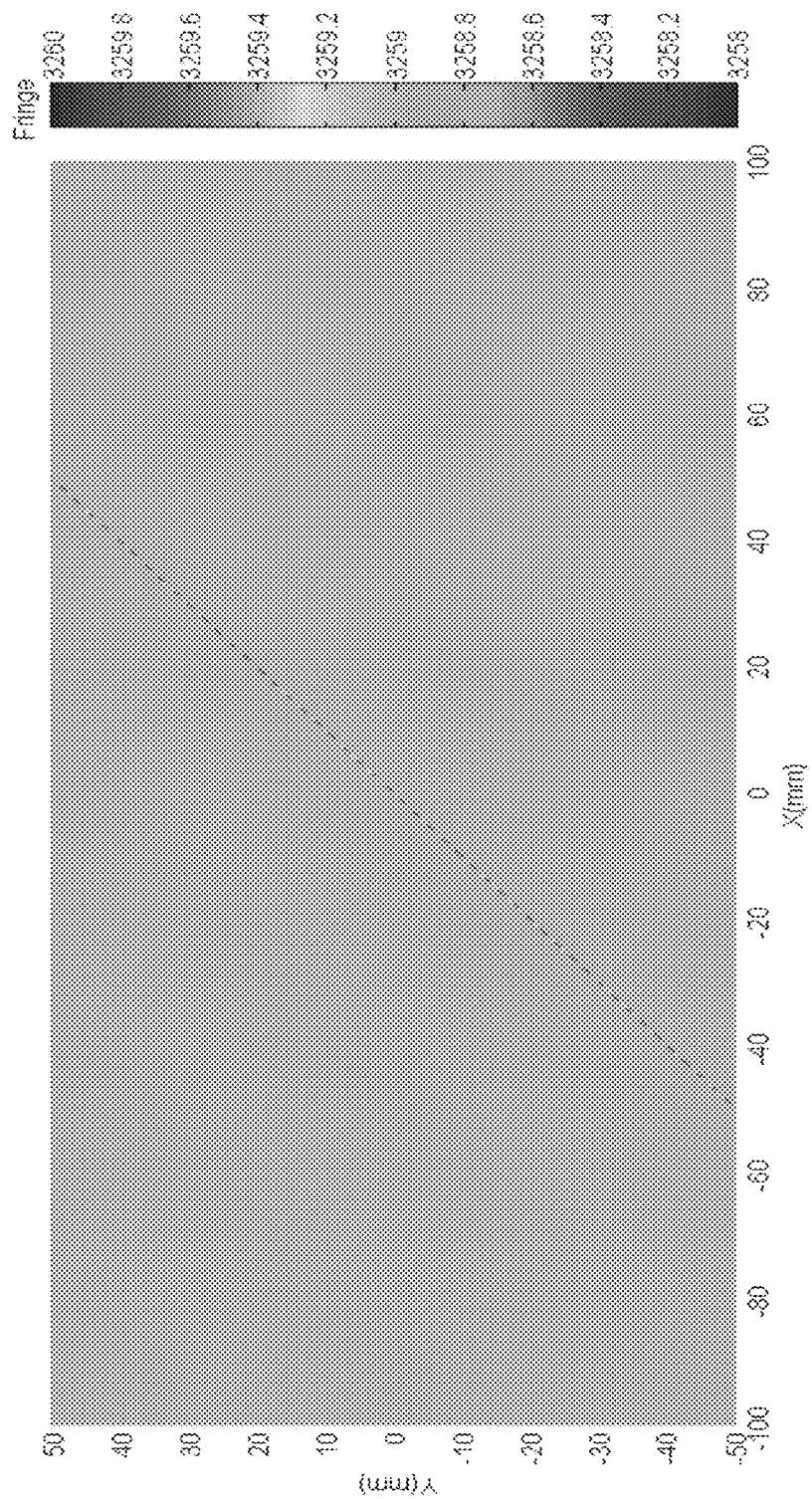
FIG. 10 shows a fringe order that is calculated based on the first and second relative phases shown in FIGS. 8 and 9.
Figure 11:
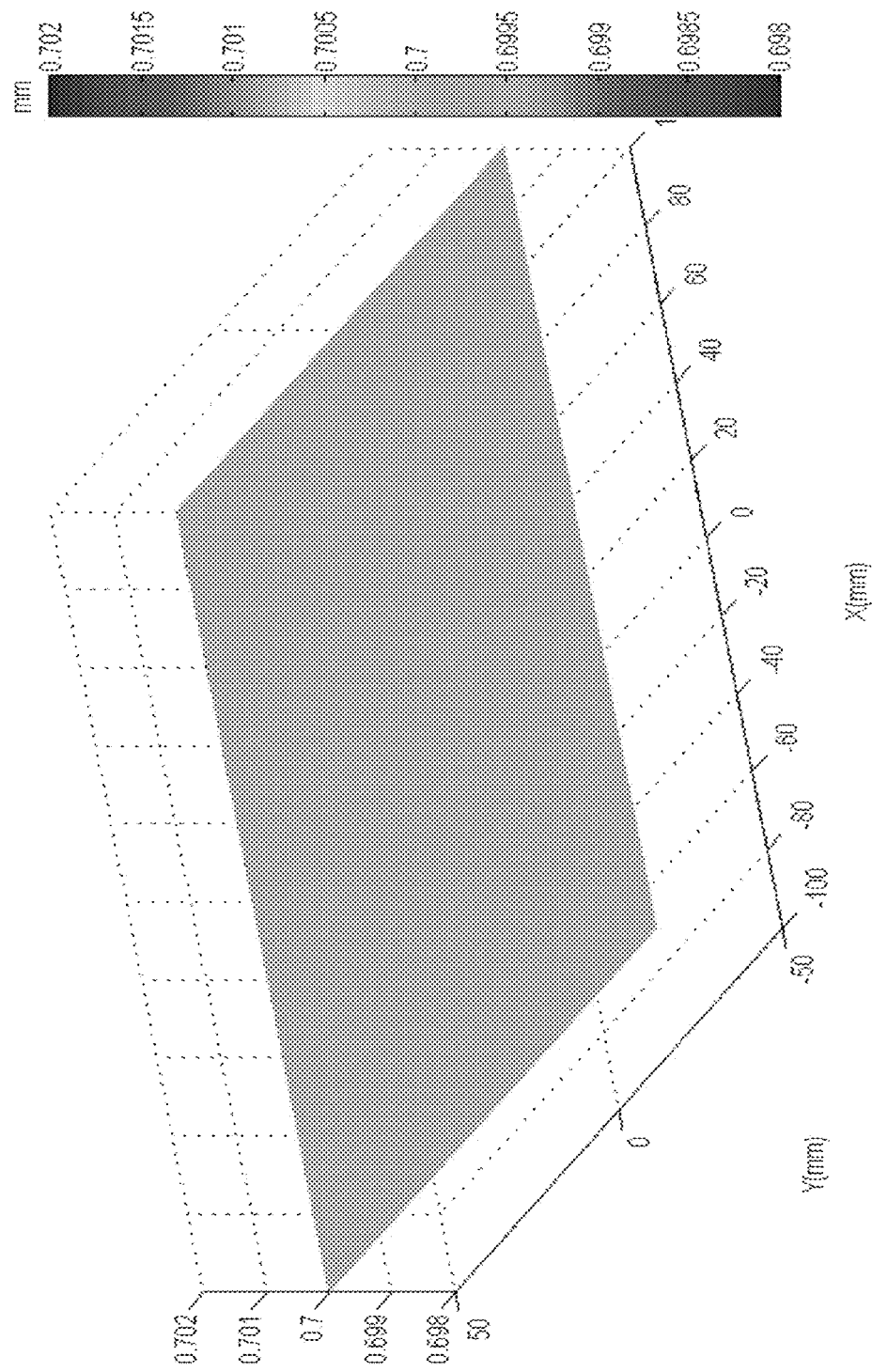
FIG. 11 shows a thickness distribution of the simulated plate-like object obtained by the optical interferometric system.

Referring to FIGS. 1, 2, 6 and 7, when the first light source 2 and the second light source 3 radiate the first and second incident lights $(\lambda_1, \lambda_2)$ on the first surface $(S_1)$ of the plate-like object 100, the first and second IFPs are imaged on the first screen 4 and the second screen 5, respectively. In particular, FIG. 6 shows the first IFP imaged on the first screen 4, and FIG. 7 shows the second IFP imaged on the second screen 5. Then, the first image capturing device 6 and the second image capturing device 7 capture the first and second light intensity distribution images of the first and second IFPs as depicted in FIGS. 6 and 7, and transmit the first and second light intensity distribution images to the image processing module 8. The processing unit 81 of the image processing module 8 converts and analyzes the first and second light intensity distribution images, obtains the first relative phase $\varphi_{rel\_1}(x,y)$ and the second relative phase $\varphi_{rel\_2}(x,y)$ at all points on the plate-like object 100, as shown in FIG. 8 and FIG. 9. Then, the processing unit 81 solves Equation (13) to calculate the fringe order $N_1(x_0,y_0)$ based on the first relative phase $\varphi_{rel\_1}(x,y)$ and the second relative phase $\varphi_{rel\_2}(x,y)$. FIG. 10 shows calculated values of the fringe order $N_1(x_0,y_0)$ at all points, and the calculated values of the fringe order $N_1(x_0,y_0)$ based on the first relative phase $\varphi_{rel\_1}(x,y)$ and the second relative phase $\varphi_{rel\_2}(x,y)$ at all points are all equal to 3259 except some particular points where x=y. The particular points will make the fringe order $N_1(x_0,y_0)$ undefined according to Equation (13) since $A_1(x,y)=A_2(x,y)$ at the particular point. As a result, a statistical average of the calculated values of the fringe order $N_1(x_0,y_0)$ is equal to 3259. Thus, the full-field distribution of the thickness t(x,y) is obtained using Equation (11) or (12), and calculated values of the thickness t(x,y) at all points are all 0.7 mm, as shown in FIG. 11. The calculated values of the thickness at all points are identical to the simulated thickness in this simulation example.

The following example is an actual measuring experiment using the optical interferometric system according to the first embodiment of the disclosure. In this experiment, a glass sheet having a length of 100 mm, a width of 200 mm and a marked thickness of 0.7 mm serves as the plate-like object. The measuring experiment is implemented on an area of 40 mm×60 mm at the center of the glass sheet.

Figure 12:
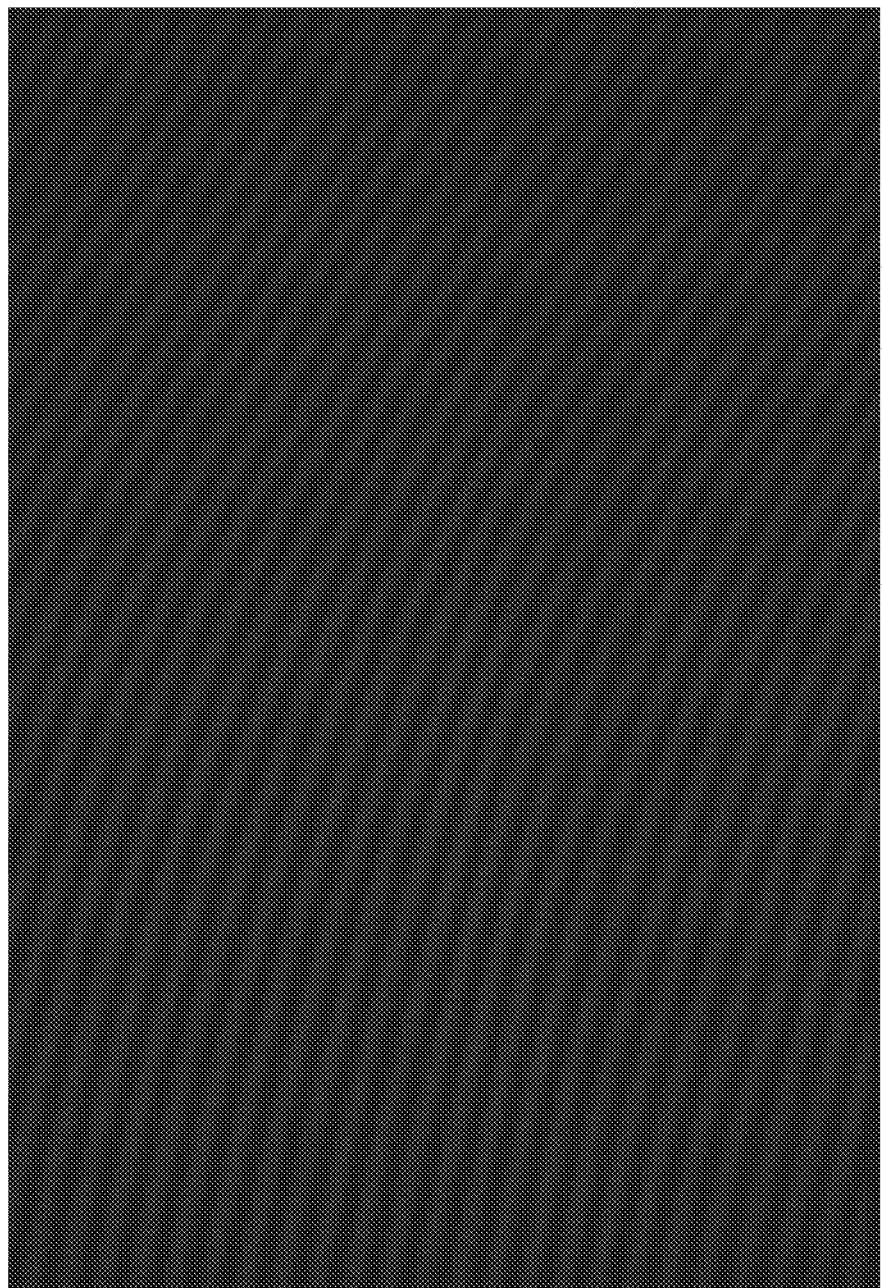
FIG. 12 shows a first IFP that results from the first incident light radiated on a glass sheet.
Figure 13:
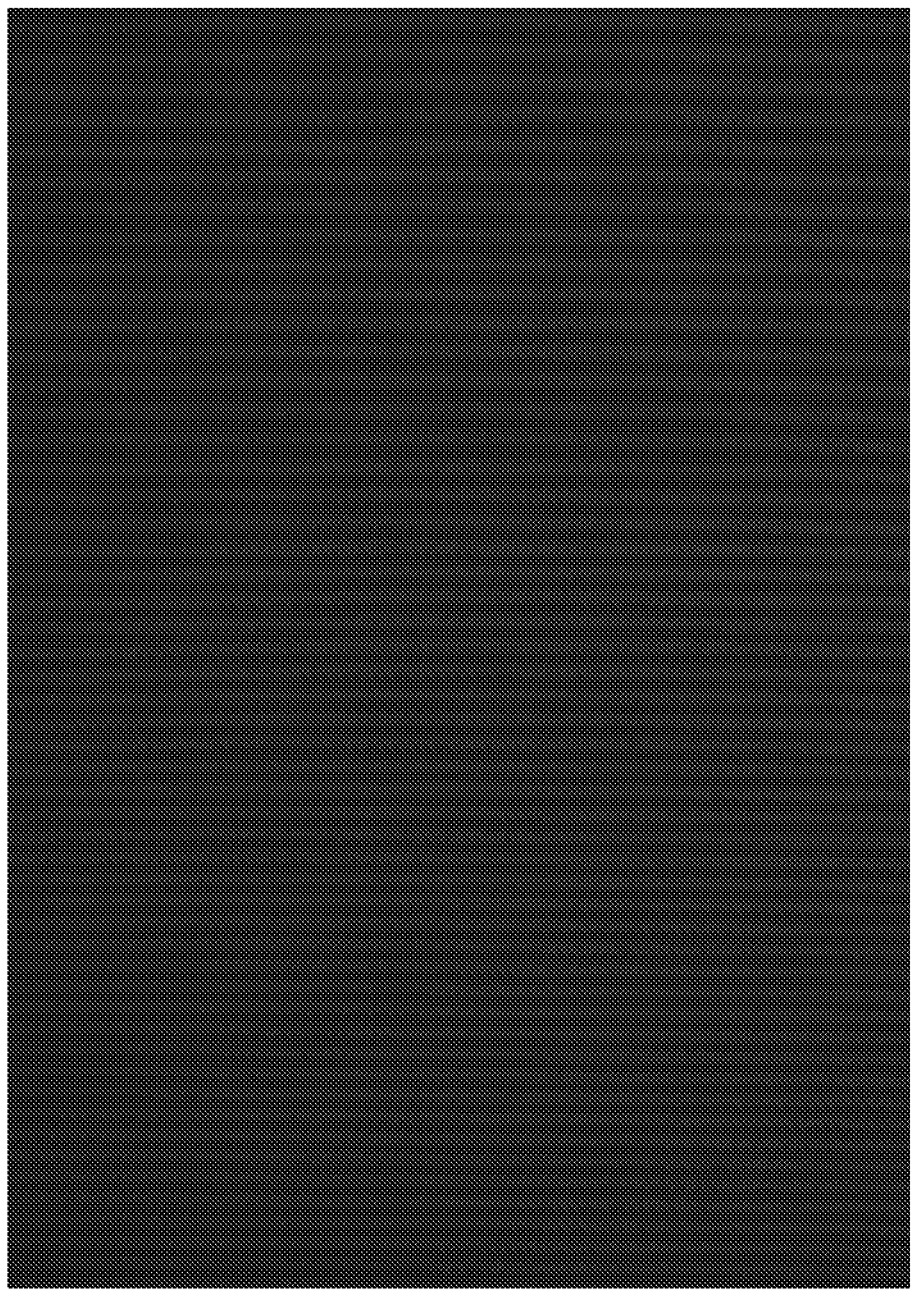
FIG. 13 shows a second IFP that results from the second incident light radiated on the glass sheet.
Figure 14:
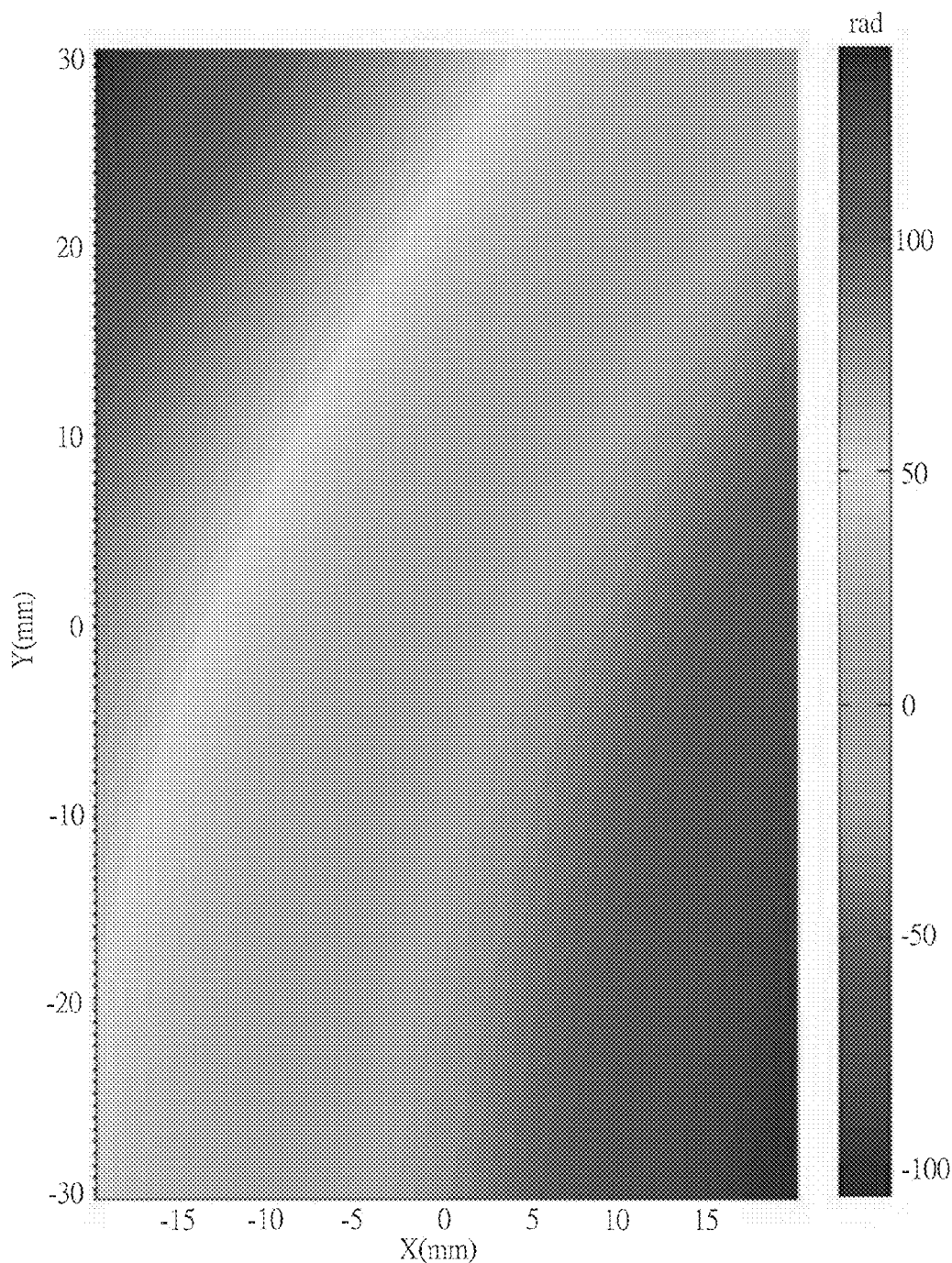
FIG. 14 shows a first relative phase that corresponds to the first IFP of FIG. 12.
Figure 15:
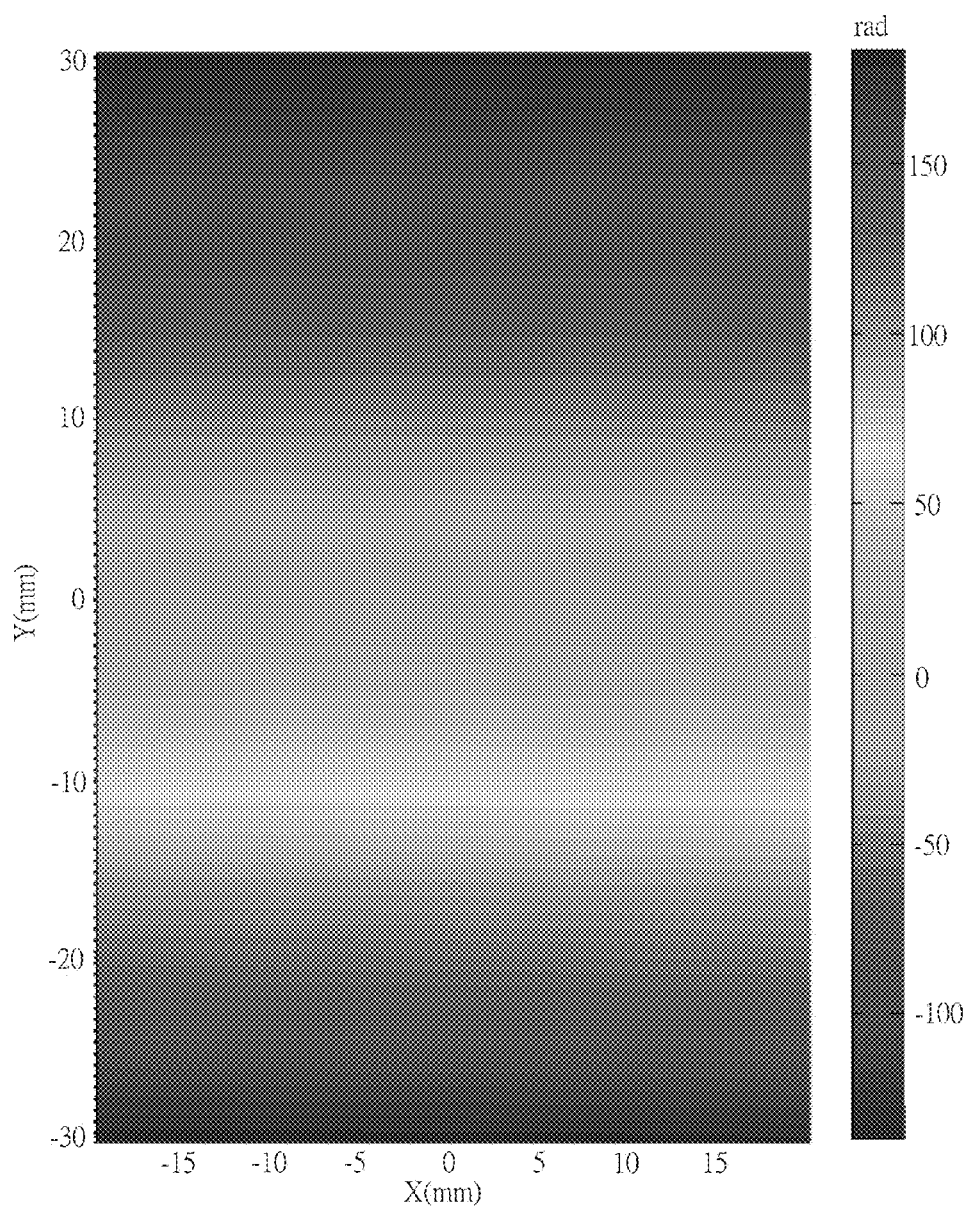
FIG. 15 shows a second relative phase that corresponds to the second IFP of FIG. 13.
Figure 16:
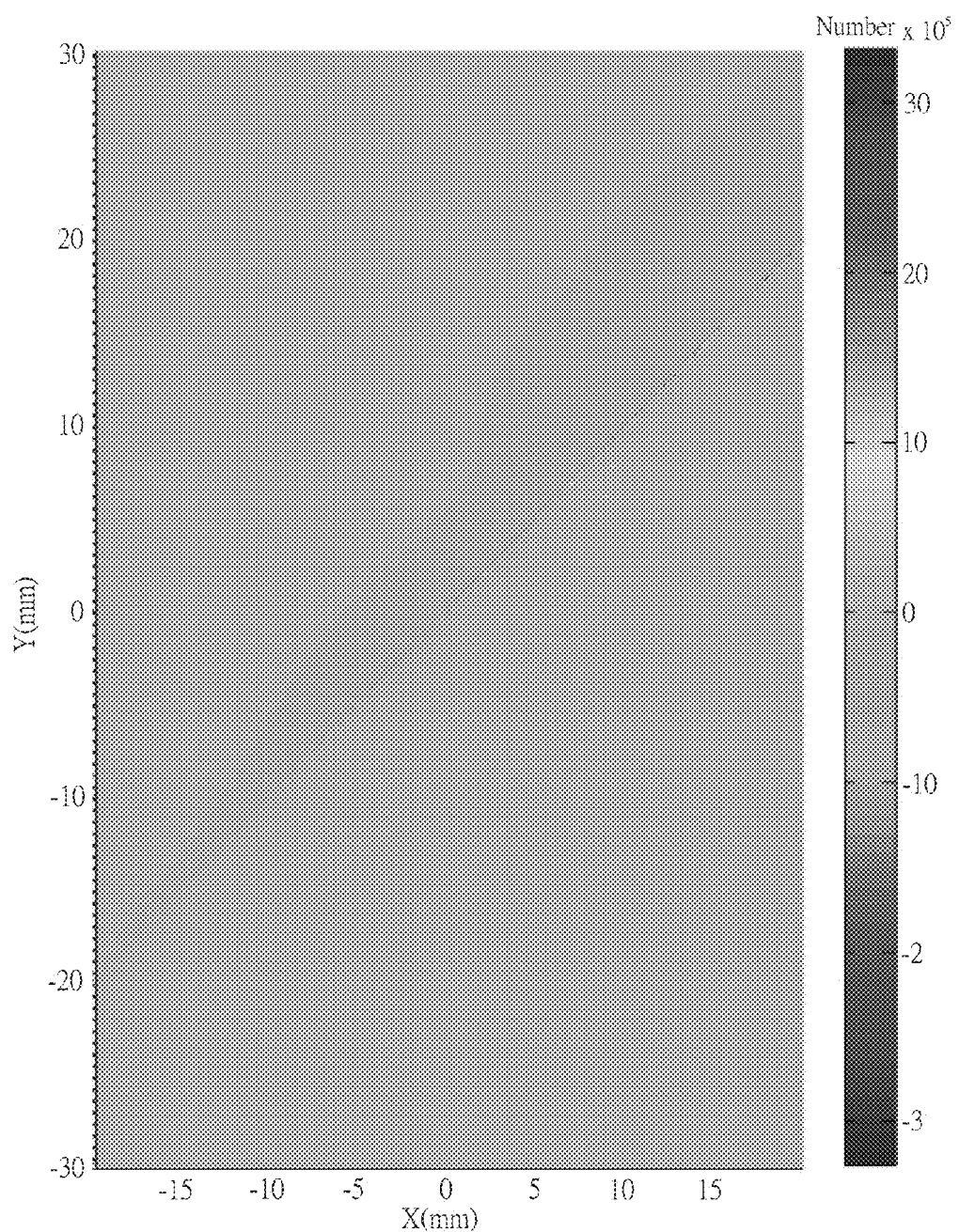
FIG. 16 shows a fringe order that is calculated based on the first and second relative phases shown in FIGS. 14 and 15.
Figure 17:
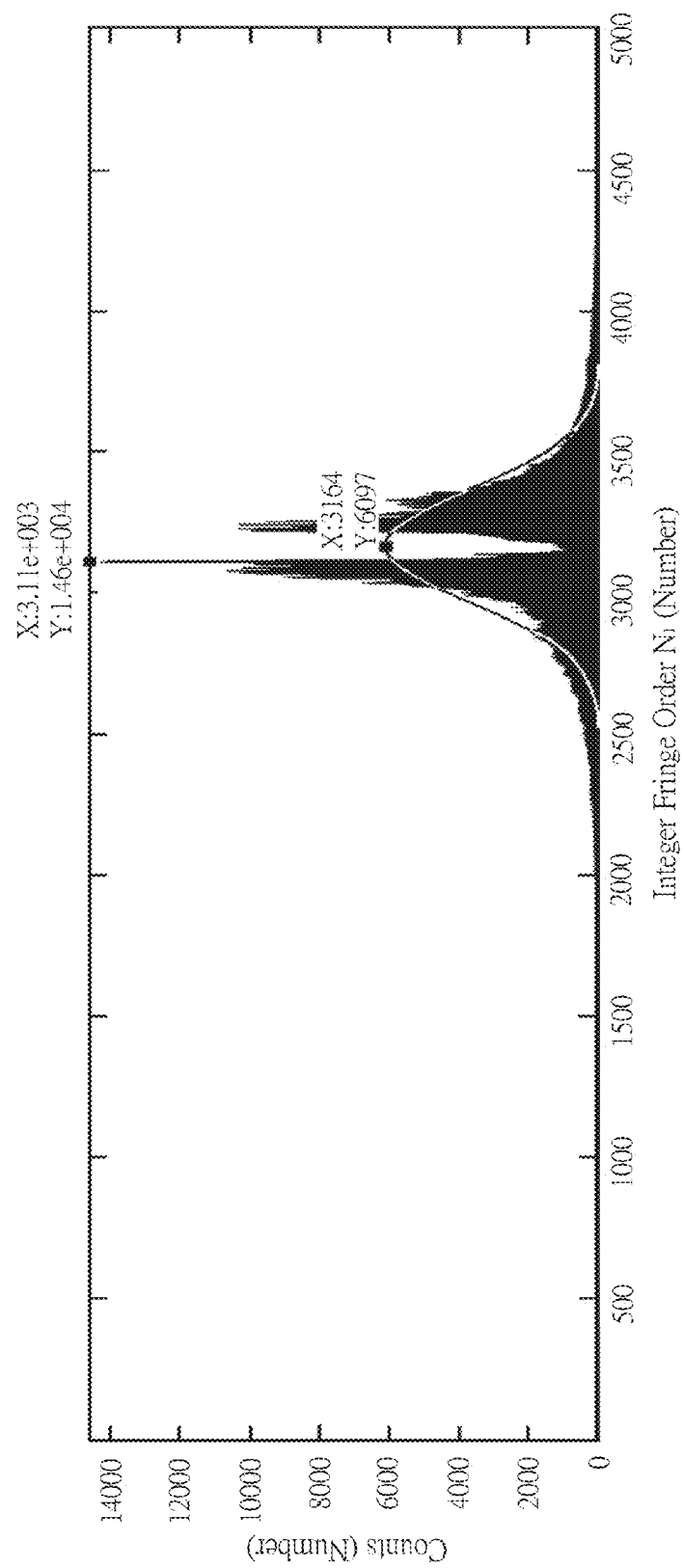
FIG. 17 is a histogram of the fringe order for obtaining an optimal value of the fringe order.
Figure 18:
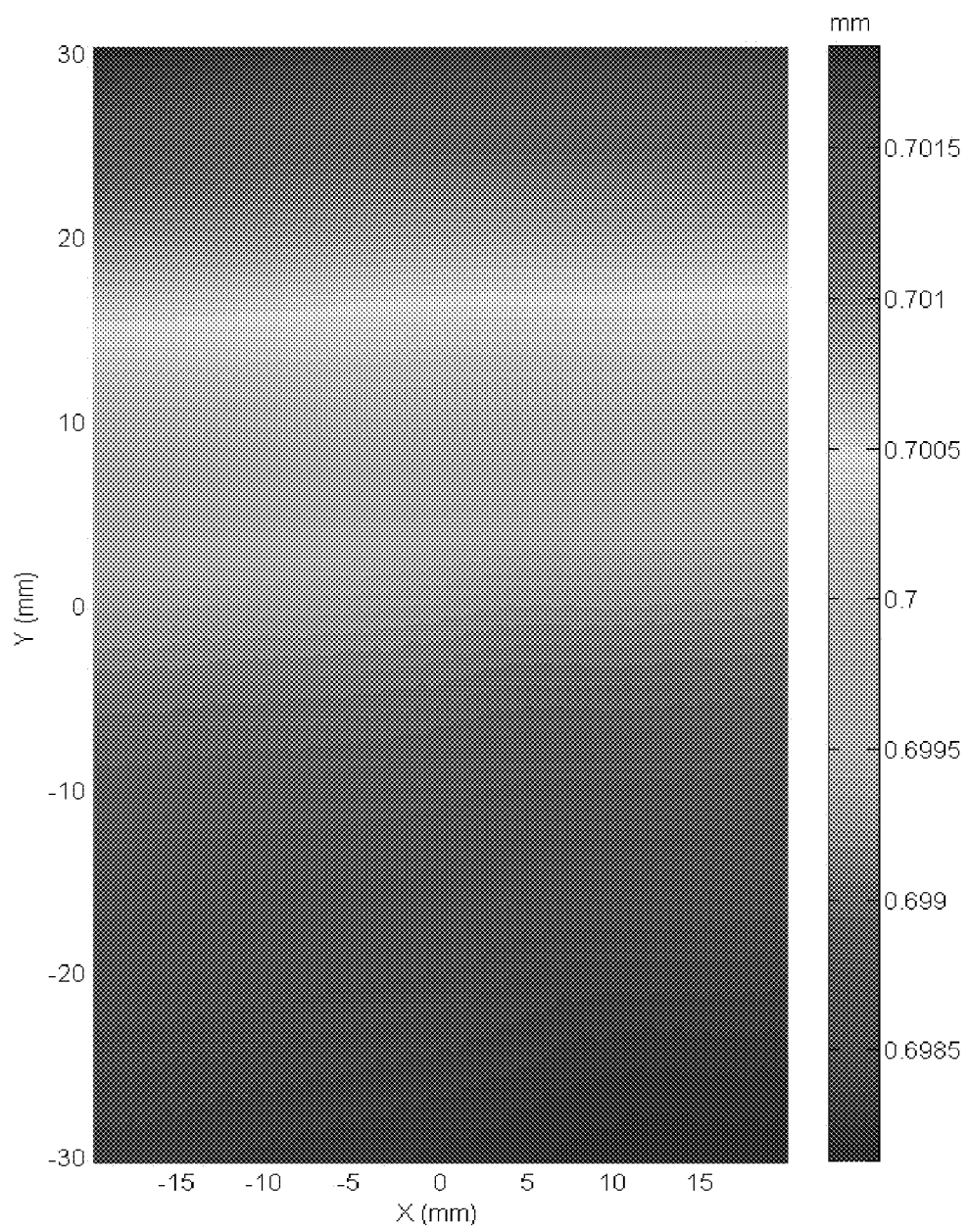
FIG. 18 shows a thickness distribution of the glass sheet obtained by the optical interferometric system according to the disclosure.

The steps of the measuring experiment are the same as the steps of the simulation example described above, and are omitted herein for the sake of brevity. FIGS. 12 and 13 show the first IFP and the second IFP imaged on the first and second screens 4, 5, respectively. It is obvious that fringes of the first and second IFPs vary in width and curvature. The variations of the width and curvature of the first and second IFPs result from variations in the thickness of the glass sheet. FIGS. 14 and 15 show the first relative phase $\varphi_{rel\_1}(x,y)$ and the second relative phase $\varphi_{rel\_2}(x,y)$ at all points on the glass sheet, respectively. The calculated values of the fringe order $N_1(x_0,y_0)$ that are calculated based on the first relative phase $\varphi_{rel\_1}(x,y)$ and the second relative phase $\varphi_{rel\_2}(x,y)$ using Equation (13) are different, as shown in FIG. 16. The differences of the calculated values of the fringe order $N_1(x_0,y_0)$ are attributed to experimental errors. For example, an installation error of the optical interferometric system may result in an error in obtaining the first relative phase $\varphi_{rel\_1}(x,y)$ and the second statistical relative phase $\varphi_{rel\_2}(x,y)$. By using methods, an optimal value of the fringe order $N_1(x_0,y_0)$ can be obtained. For example, FIG. 17 is a histogram showing distribution of the calculated values of the fringe order $N_1(x_0,y_0)$. In an ideal case, the histogram has only one peak. However, the histogram shown in FIG. 17 has two peaks that are attributed to the experimental errors. Therefore, a Gaussian function can be used to fit the distribution of the calculated values of the fringe order $N_1(x_0,y_0)$ for obtaining the optimal value, for example, 3164 as shown in FIG. 17. By substituting the optimal value of the fringe order $N_1(x_0,y_0)$ to Equation (11), the full-field distribution of the thickness t(x,y) of the glass sheet can be obtained, as shown in FIG. 18. FIG. 18 shows that the thickness of the glass sheet is certainly non-uniform.

Figure 19:
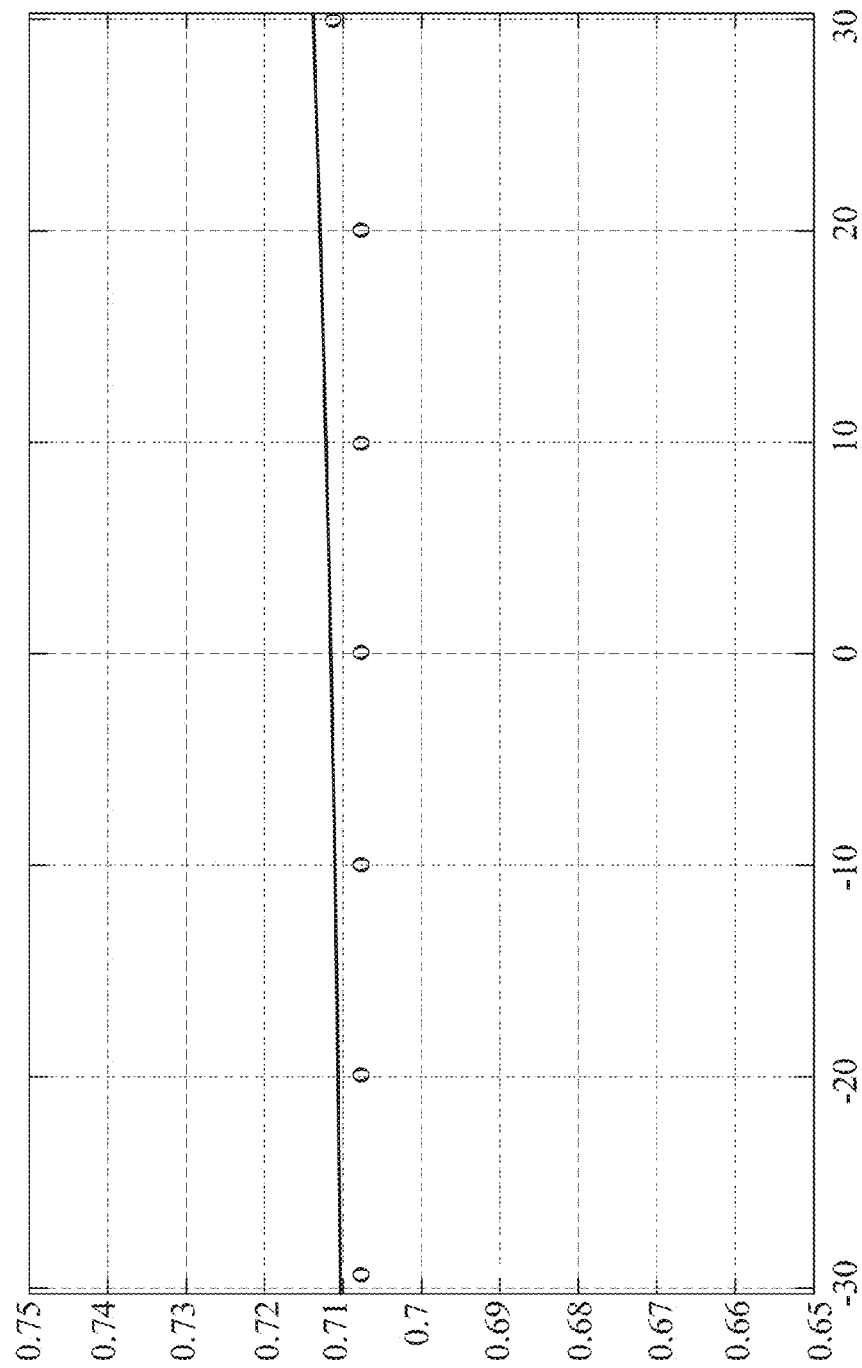
FIG. 19 shows measured values of a thickness distribution of the glass sheet along a y-axis measured by the optical interferometric system according to the disclosure and a conventional thickness gauge.

FIG. 19 shows measured values of the thickness of the glass sheet by a conventional thickness gauge having a resolution of 1 µm and an accuracy of 3 µm. For example, the thickness of the glass sheet at 7 points along the y-axis (i.e., x=0) with an interval of 10 mm are measured by the conventional thickness gauge. In particular, coordinates of the points are (0,−30),(0,−20), (0, −10), (0,0), (0,10), (0,20) and (0,30), respectively. In FIG. 19, a solid line illustrates the calculated values of the thickness of the glass sheet obtained by the optical interferometric system according to the disclosure, and symbols "o" illustrate the measured values of the thickness of the glass sheet obtained by the conventional thickness gauge at these seven points. It is noted that the calculated values are very close to the measured values, and the maximum difference between any measured value and the corresponding calculated value appears at the point (0,20) and is merely 0.5%. In other words, the optical interferometric system according to the disclosure is able to obtain an accurate result of the distribution of the thickness of the plate-like object 100.

Figure 20:
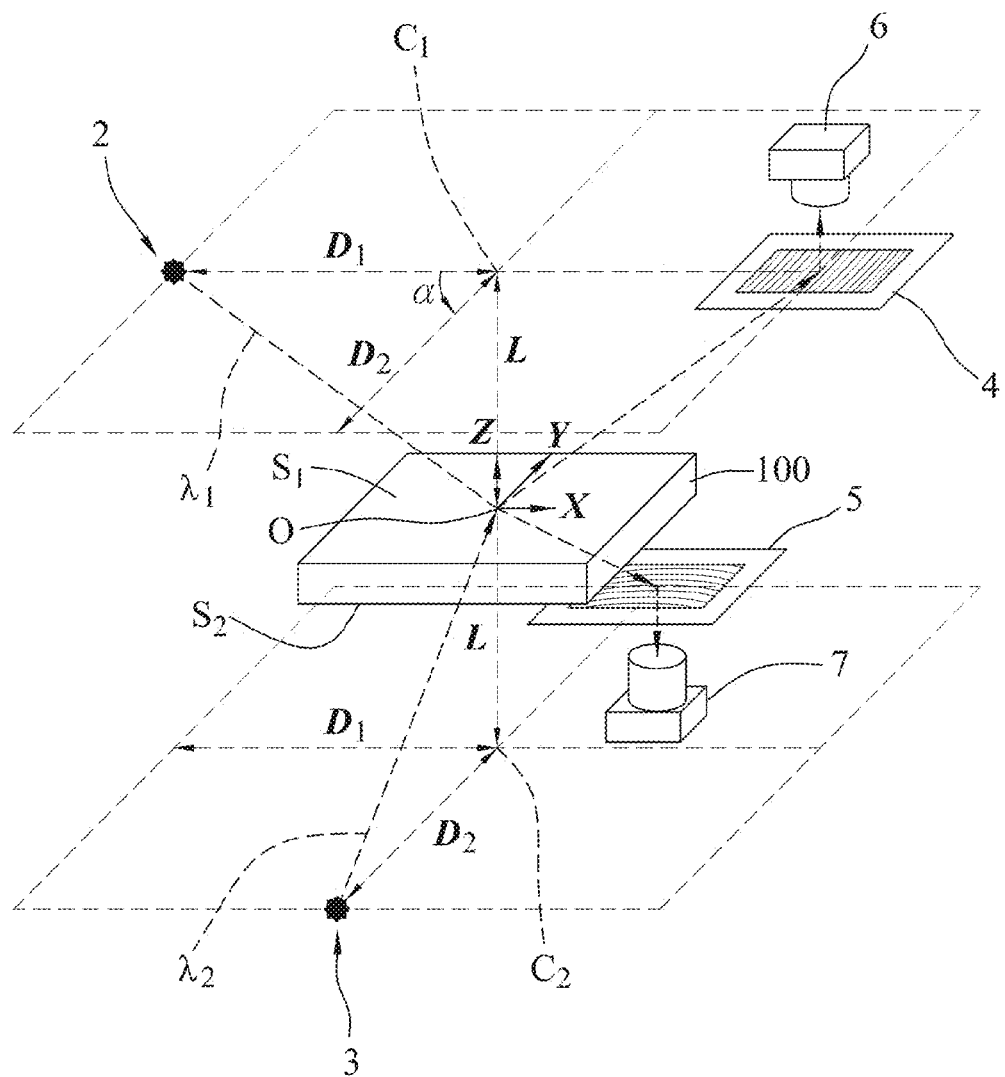
FIG. 20 is a schematic perspective view of a second embodiment of the optical interferometric system according to the disclosure.
Figure 21:
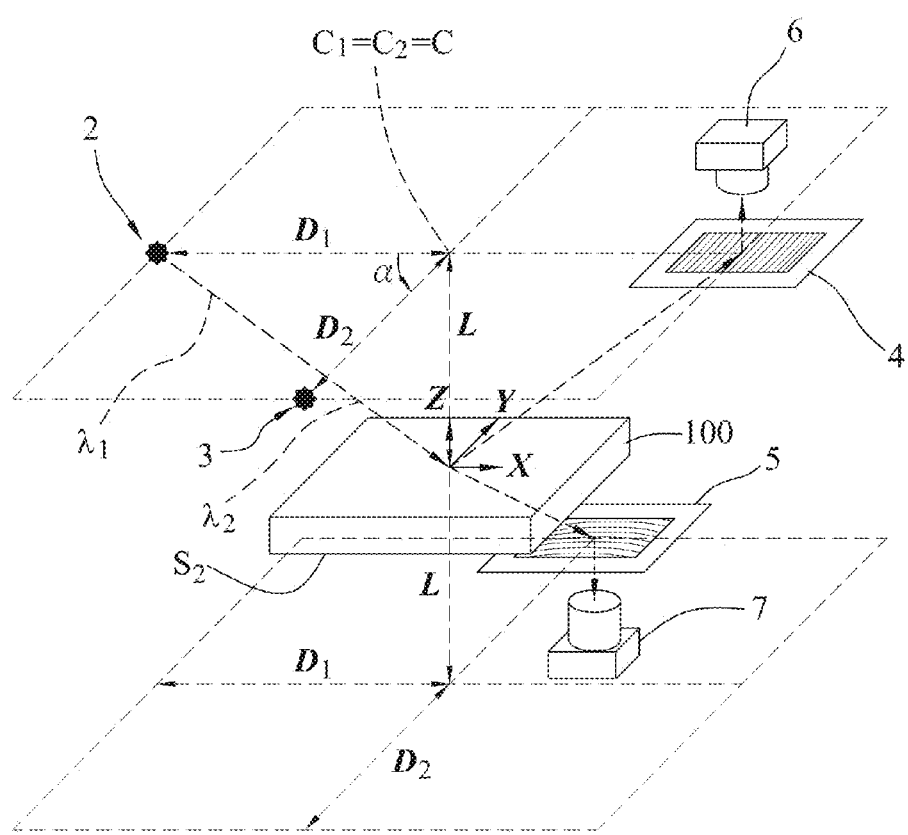
FIG. 21 is a schematic perspective view of a third embodiment of the optical interferometric system according to the disclosure.
Figure 22:
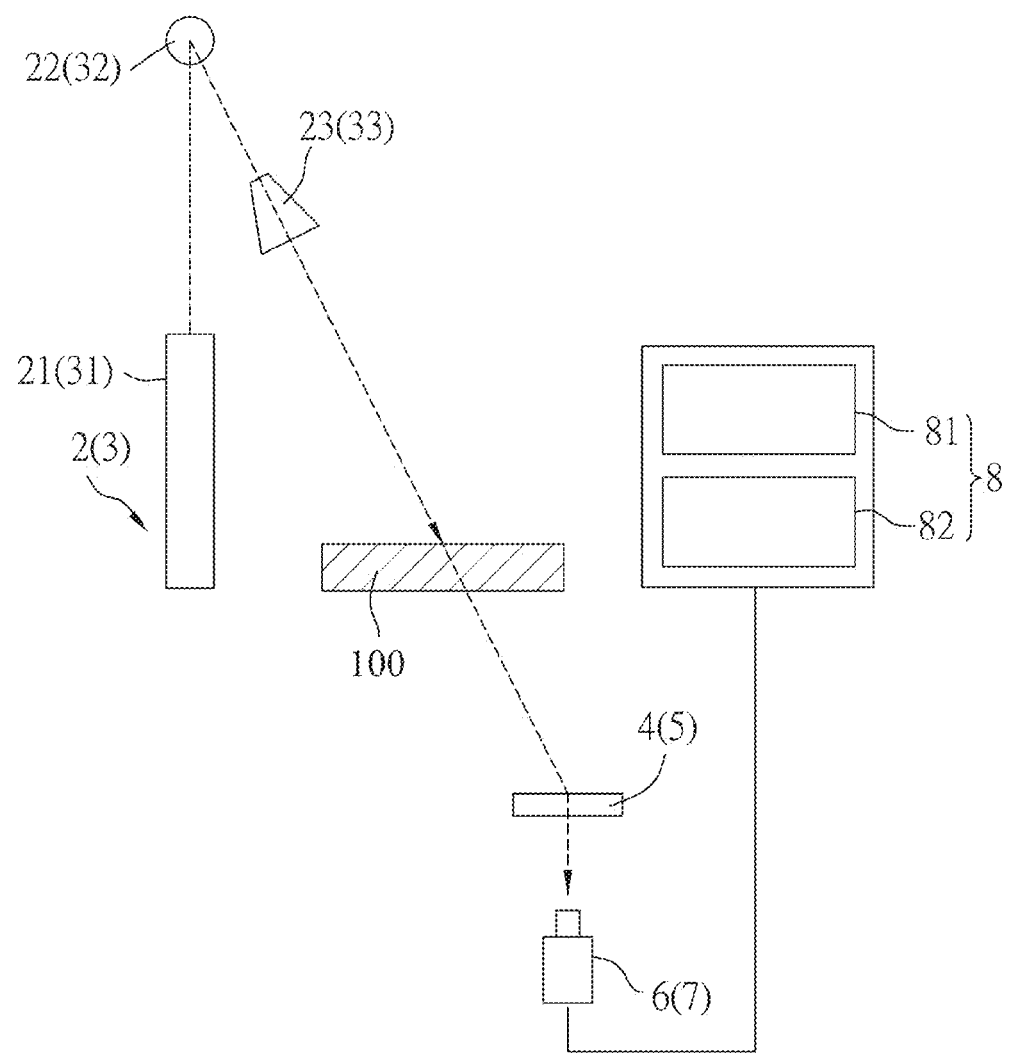
FIG. 22 is a schematic side view of the third embodiment.
Figure 23:
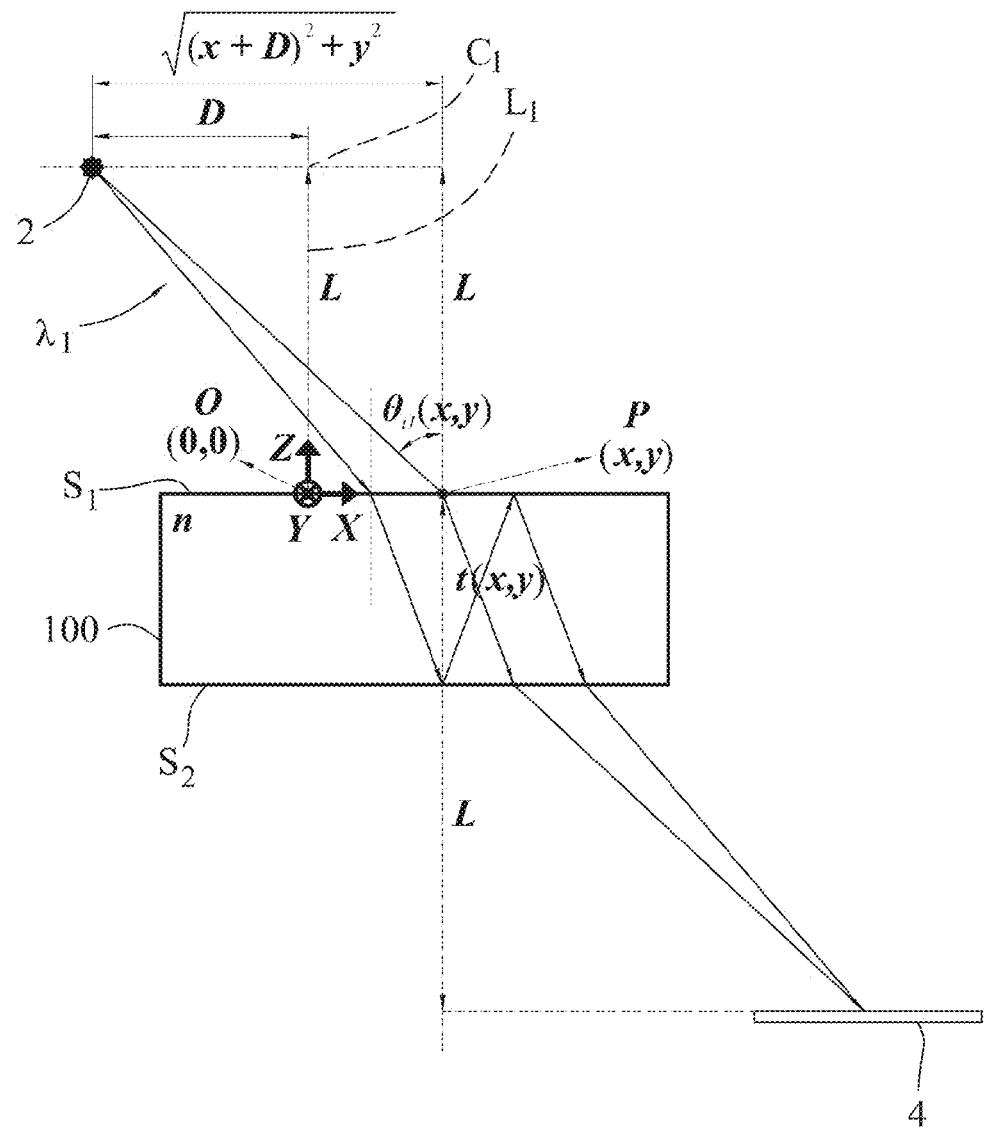
FIG. 23 is a schematic side view illustrating an optical path of the first incident light radiated by the first light source of the third embodiment.
Figure 24:
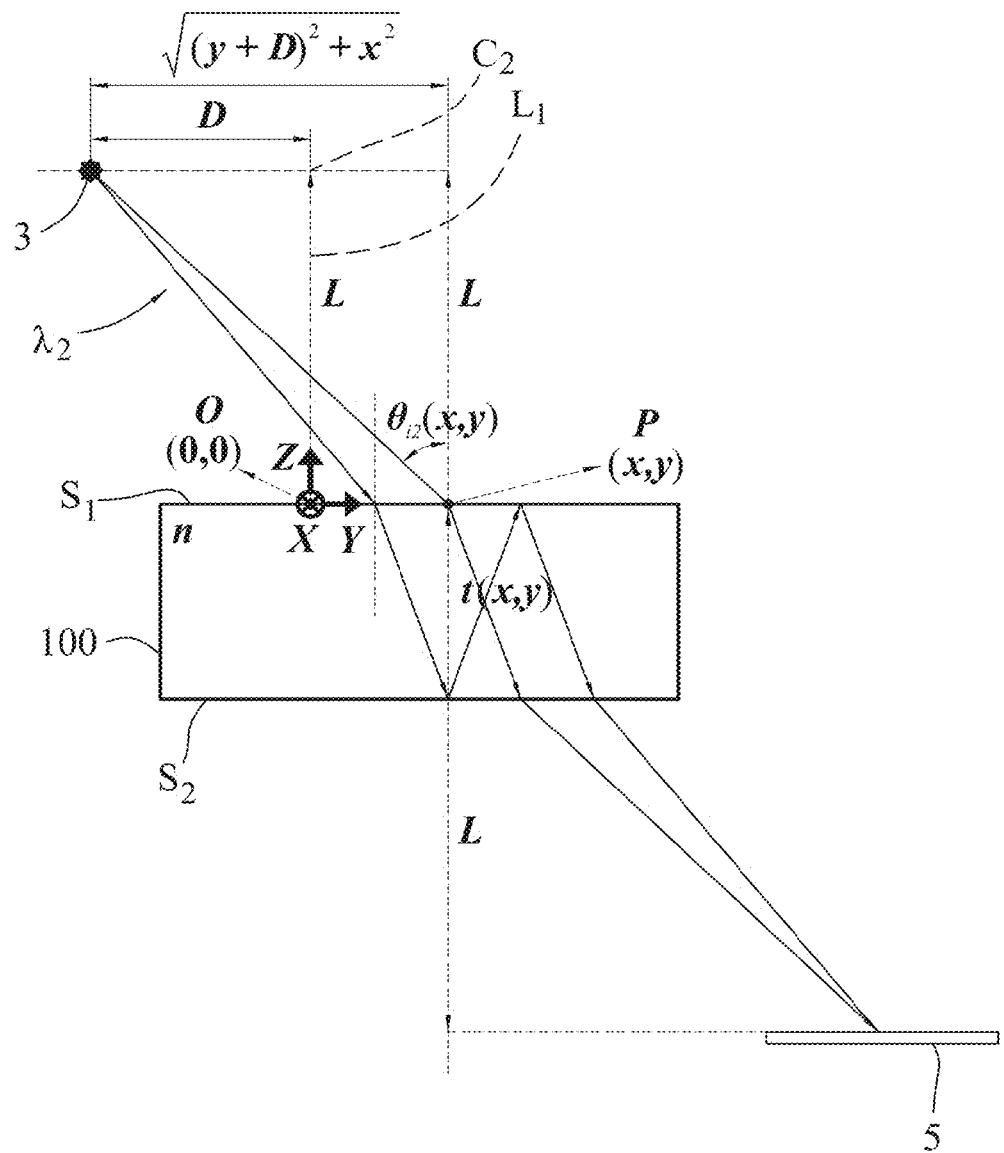
FIG. 24 is a schematic side view illustrating an optical path of the second incident light radiated by the second light source of the third embodiment.

Referring to FIG. 20, the second embodiment of the optical interferometric system according to the disclosure is shown to be similar to the first embodiment. The difference between the first embodiment and the second embodiment lies in the positions of the light sources 2, 3 and the screens 4, 5. Particularly, one of the first light source 2 and the second light source 3 is placed above the first surface ($S_1$) of the plate-like object 100, and the other one is placed below the second surface ($S_2$) of the plate-like object 100. The first screen 4 and the first image capturing device 6 that correspond to the first light source 2 are placed at the same side of the plate-like object 100 where the first light source 2 is placed, and the second screen 5 and the second image capturing device 7 that correspond to the second light source 3 are placed at the same side of the plate-like object 100 where the second light source 3 is placed. Although the components are placed in a manner that is different from the first embodiment, the first and second IFPs can still clearly be imaged on the first screen 4 and the second screen 5, respectively. Further, the difference between optical paths respectively of the two parts of each of the first and second incident lights ($\lambda_1$, $\lambda_2$) is the same as the description in the first embodiment. Therefore, Equations (11) to (13) derived in the first embodiment can be used in the second embodiment, and the optical interferometric system of the second embodiment is able to function as well as the first embodiment.

Referring to FIGS. 21-24, the third embodiment of the optical interferometric system according to the disclosure is shown to be similar to the first embodiment. The difference between the first and third embodiments is that one of the first screen 4 and the second screen 5 and a corresponding one of the first image capturing device 6 and the second image capturing device 7 are placed below the second surface ($S_2$) of the plate-like object 100. Further, according to Snell's Law, one part of the second incident light ($S_2$) penetrates the first surface ($S_1$) of the plate-like object 100, propagates to the second surface ($S_2$) of the plate-like object 100, penetrates the second surface ($S_2$), and propagates to the second screen 5. Meanwhile, another part of the second incident light ($\lambda_2$) penetrates the first surface ($S_1$), propagates to the second surface ($S_2$), reflects twice between the first surface ($S_1$) and the second surface ($S_2$), penetrates the second surface ($S_2$), and propagates to the second screen 5. It is obvious that the difference between the optical paths respectively of the two parts of each of the first and second incident lights ($\lambda_1$, $\lambda_2$) is the same as the first embodiment. Therefore, Equations (11) to (13) derived in the first embodiment can be used in the third embodiment, and the optical interferometric system of the third embodiment is able to function as well as the first embodiment.

Figure 25:
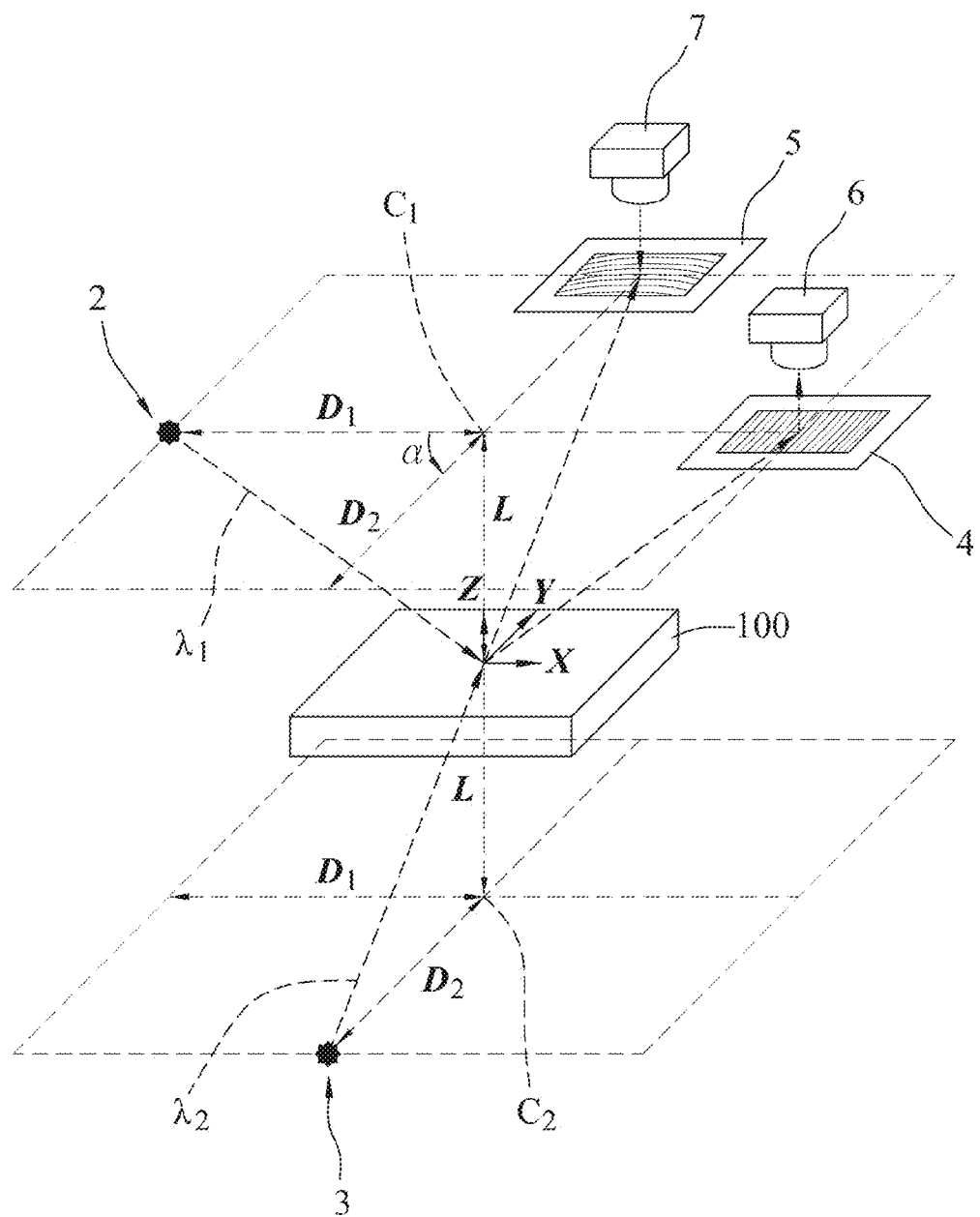
FIG. 25 is a schematic perspective view of a fourth embodiment of the optical interferometric system according to the disclosure.
Figure 26:
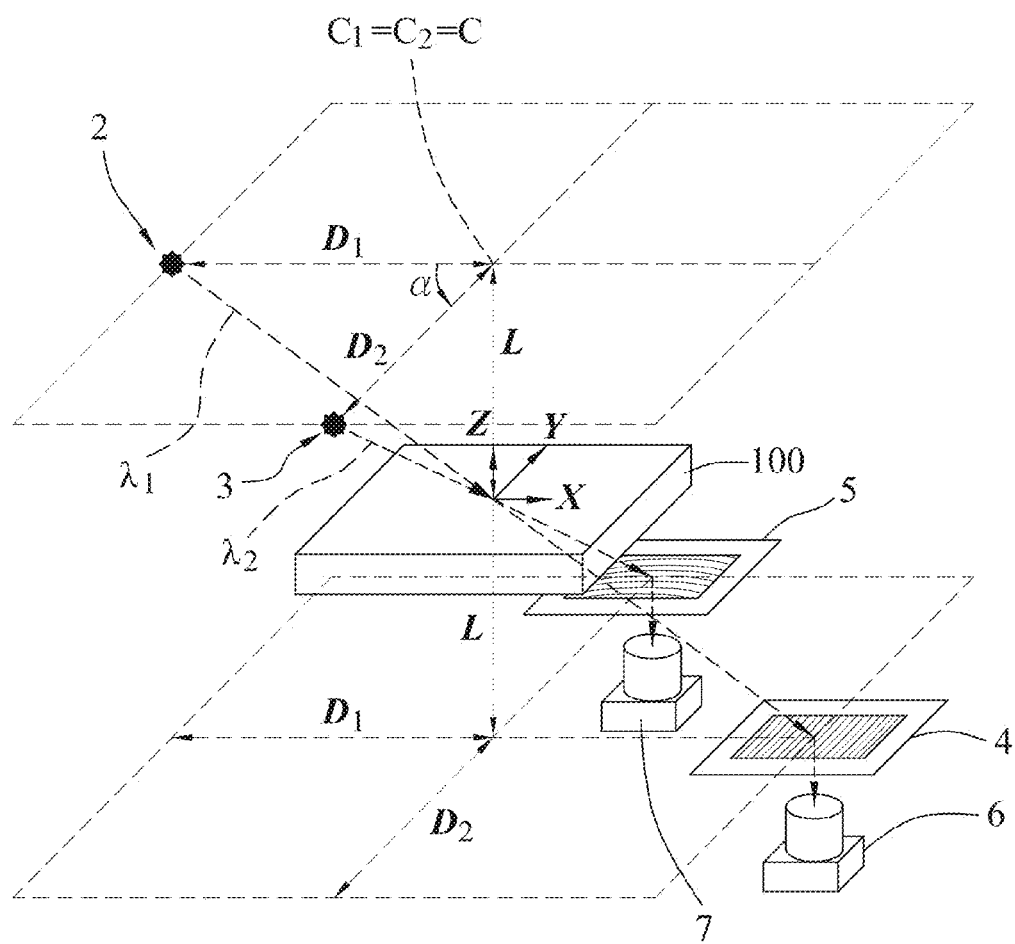
FIG. 26 is a schematic perspective view of a fifth embodiment of the optical interferometric system according to the disclosure.
Figure 27:
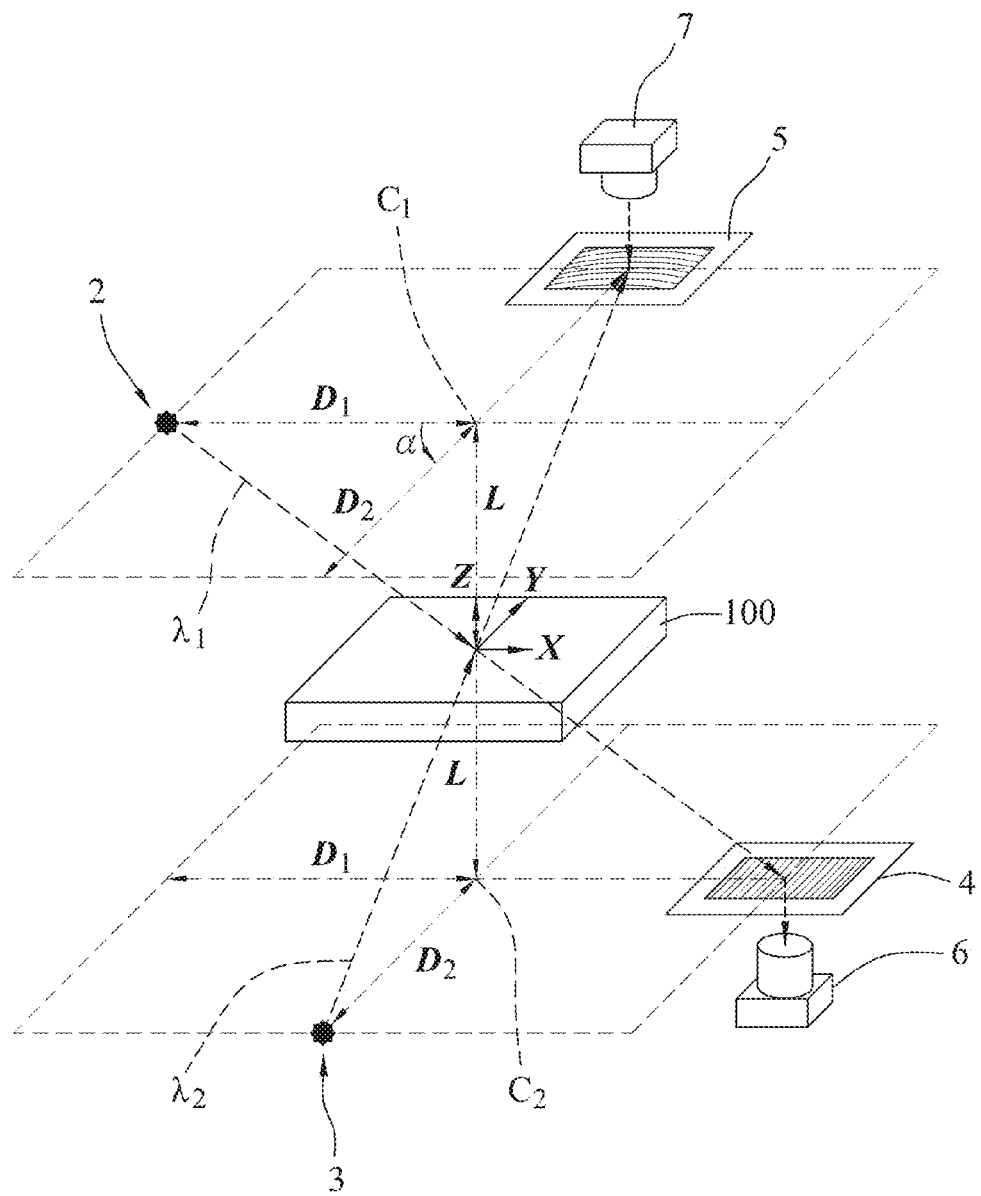
FIG. 27 is a schematic perspective view of a sixth embodiment of the optical interferometric system according to the disclosure.

FIGS. 25-27 illustrate the fourth, fifth and sixth embodiments of the optical interferometric system according to the disclosure, respectively. In each of the fourth, fifth and sixth embodiments, arrangement of components of the optical interferometric system differs from those of the previous embodiments. Based on the same reason described in the second and third embodiments, Equations (11) to (13) can also be used in the fourth, fifth and sixth embodiments.

In conclusion, the optical interferometric system according to the disclosure is able to measure and obtain the full-field distribution of the thickness t(x,y) of the plate-like object 100 by simply capturing the first and second IFPs and calculating the fringe order $N_1(x_0,y_0)$ at the reference point (O), without spending additional time and using additional measuring instruments to measure the average thickness or an absolute thickness at one point on the plate-like object 100. Therefore, the optical interferometric system according to the disclosure is certainly able to measure the full-field thickness t(x,y) on a production line in real-time.

In the description above, for the purposes of explanation, numerous specific details have been set forth in order to provide a thorough understanding of the embodiments. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that the disclosure is not limited to the disclosed embodiments but is intended to cover various arrangements included within the spirit and scope of the broadest interpretation so as to encompass all such modifications and equivalent arrangements.

What is claimed is:

1. An optical interferometric system for measurement of a full-field thickness of a plate-like object in real time, said optical interferometric system comprising:
   a first light source for radiating a first incident light in a first direction toward a reference point located on a surface of the plate-like object to produce a first interference fringe pattern (IFP);
   a second light source for radiating a second incident light in a second direction different from the first direction toward the reference point to produce a second IFP, the first incident light and the second incident light being coherent, having spherical wavefronts, and radiating the plate-like object with the spherical wavefronts;
   a first screen and a second screen for allowing the first and second IFPs to be imaged thereon, respectively;
   a first image capturing device and a second image capturing device that are disposed to face said first screen and second screen, respectively, and that are configured to respectively capture first and second light intensity distribution images respectively of the first and second IFPs imaged respectively on said first and second screens; and
   an image processing module that is electrically connected to said first image capturing device and said second image capturing device, and that is configured to
      convert the first and second light intensity distribution images into digital data,
      calculate a fringe order at the reference point according to digital data, and
      obtain a full-field distribution of the thickness of the plate-like object according to the fringe order.

2. The optical interferometric system of claim 1, wherein said image processing module is configured to calculate the fringe order by obtaining a first relative phase of the first IFP and a second relative phase of the second IFP, and calculating the fringe order based on the first and second relative phases.

3. The optical interferometric system of claim 2, wherein said image processing module is configured to calculate the fringe order $N_1$ at the reference point located at coordinates $(x_0, y_0)$ based upon $$N_1(x_0, y_0) = \text{round}\left\{\frac{A_2(x, y)\varphi_{rel\_2}(x, y) - A_1(x, y)\varphi_{rel\_1}(x, y)}{2\pi[A_1(x, y) - A_2(x, y)]}\right\},$$

$$A_1(x, y) = \frac{\lambda}{4\pi n \cos\left[\sin^{-1}\left(\frac{1}{n}\sin\theta_{i1}(x, y)\right)\right]},$$

and $$A_2(x, y) = \frac{\lambda}{4\pi n \cos\left[\sin^{-1}\left(\frac{1}{n}\sin\theta_{i2}(x, y)\right)\right]},$$

where $\varphi_{rel\_1}(x,y)$ denotes the first relative phase, $\varphi_{rel\_2}(x,y)$ denotes the second relative phase, $\lambda$ denotes a wavelength of the first and second incident lights, n denotes an index of refraction of the plate-like object, $\theta_{i1}(x,y)$ denotes a first angle of incidence of the first incident light, and $\theta_{i2}(x,y)$ denotes a second angle of incidence of the second incident light.

4. The optical interferometric system of claim 3, wherein said image processing module is configured to calculate the full-field distribution of the thickness t(x,y) based upon one of:

$$t(x,y)=A_1(x,y)\varphi_1(x,y), \text{ and}$$

$$t(x,y)=A_2(x,y)\varphi_2(x,y),$$

where $\varphi_1(x,y)$ denotes a first absolute phase of the first IFP, and $\varphi_2(x,y)$ denotes a second absolute phase of the second IFP.

5. The optical interferometric system of claim 4, wherein the first and second absolute phases are expressed respectively by $\varphi_1(x,y)=2\pi N_1(x_0, y_0)+\varphi_{rel\_1}(x,y)$ and $\varphi_2(x,y)=2\pi N_2(x_0, y_0)+\varphi_{rel\_2}(x,y)$, where $\varphi_1(x_0, y_0)=\varphi_2(x_0, y_0)$, and $N_2(x_0, y_0)=N_2(x_0, y_0)$,
   wherein said image processing module is configured to calculate the full-field distribution of the thickness t(x,y) based upon one of:

$$t(x,y)=A_1(x,y)[2\pi N_1(x_0, y_0)+\varphi_{rel\_1}(x, y)], \text{ and}$$

$$t(x,y)=A_2(x,y)[2\pi N_1(x_0, y_0)+\varphi_{rel\_2}(x, y)].$$

6. The optical interferometric system of claim 1, wherein said first and second light sources are arranged in a manner that a first distance between said first light source and a normal to the surface of the plate-like object at the reference point is equal to a second distance between said second light source and the normal.

7. The optical interferometric system of claim 6, wherein said first and second light sources are arranged in a manner that a first imaginary extension line extending from said first light source toward the normal and perpendicular to the normal intersects the normal at a first intersection point, a second imaginary extension line extending from said second light source toward the normal and perpendicular to the normal intersects the normal at a second intersection point, and a third distance between the first intersection point and the reference point is equal to a fourth distance between the second intersection point and the reference point.

8. The optical interferometric system of claim 7, wherein a first angle of incidence $\theta_{i1}(x,y)$ of the first incident light and a second angle of incidence $\theta_{i2}(x,y)$ of the second incident light at the reference point with coordinates $(x_0,y_0)$ are expressed by $$\theta_{i1}(x_0, y_0) = \theta_{i2}(x_0, y_0) = \tan^{-1}\frac{D}{L},$$

where D denotes the first and second distances, and L denotes the third and fourth distances.

9. The optical interferometric system of claim 1, wherein each of said first light source and said second light source includes a laser source for outputting a laser beam, and a spatial-filter point-expanding device, and a beam steering element for guiding the laser beam toward said spatial-filter point-expanding device, wherein said spatial-filter point-expanding device is configured to filter and expand the laser beam so as to output each of the first incident light and the second incident light having the spherical wavefronts.

10. The optical interferometric system of claim 1, wherein said image processing module includes:

a processing unit that is configured to convert the first and second light intensity distribution images into the digital data, to calculate the fringe order, and to obtain the full-field distribution of the thickness; and a display device that is configured to display the full-field distribution of the thickness.

11. The optical interferometric system of claim 1, wherein said first and second light sources are configured to radiate the first incident light and second incident light passing through the plate-like object that is transparent and that is one of a glass sheet and a plastic substrate, the plastic substrate being made of one of polyethylene terephthalate (PET), polyethylene naphthalate (PEN) and polycarbonate (PC).

12. The optical interferometric system of claim 1, wherein said first and second light sources are configured to radiate infrared light as the first incident light and second incident light toward the plate-like object that is not transparent and that is made of one of silicon wafer and metallic film.

* * * * *